US010035651B2

(12) United States Patent
Lindbo et al.

(10) Patent No.: US 10,035,651 B2
(45) Date of Patent: Jul. 31, 2018

(54) STORAGE SYSTEMS AND METHODS FOR RETRIEVING UNITS FROM A STORAGE SYSTEM

(71) Applicant: OCADO INNOVATION LIMITED, Hatfield (GB)

(72) Inventors: Lars Sverker Ture Lindbo, Welwyn (GB); Robert Rolf Stadie, Eversley (GB); Christopher Richard James Brett, St Albans (GB); Matthew Robert Whelan, Luton (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 15/595,360

(22) Filed: May 15, 2017

(65) Prior Publication Data

US 2018/0029798 A1    Feb. 1, 2018

Related U.S. Application Data

(63) Continuation of application No. 14/400,497, filed as application No. PCT/GB2013/051215 on May 10, 2013, now Pat. No. 9,682,822.

(30) Foreign Application Priority Data

May 11, 2012   (GB) .................................. 1208292.1
May 16, 2012   (GB) .................................. 1208612.0

(51) Int. Cl.
   *B65G 1/137*   (2006.01)
   *B65G 1/04*    (2006.01)
   *G05B 15/02*   (2006.01)

(52) U.S. Cl.
   CPC ........... *B65G 1/137* (2013.01); *B65G 1/0464* (2013.01); *G05B 15/02* (2013.01)

(58) Field of Classification Search
   USPC ......................................................... 700/218
   See application file for complete search history.

(56) References Cited

U.S. PATENT DOCUMENTS 6,654,662 B1    11/2003  Hognaland
2001/0038784 A1*  11/2001  Peltomaki ............ B65G 1/0485
                                                414/273

(Continued)

FOREIGN PATENT DOCUMENTS

DE   2629718 A1   1/1978
EP   0767113 B1   7/2002

(Continued)

OTHER PUBLICATIONS

International Search Report (PCT/ISA/210) dated Aug. 1, 2013, by the European Patent Office as the International Searching Authority for International Application No. PCT/GB2013/051215.

(Continued)

*Primary Examiner* — Kyle O Logan
(74) *Attorney, Agent, or Firm* — Buchanan Ingersoll & Rooney PC

(57) ABSTRACT

A system and method suitable for storing multiple product lines in an automated warehouse environment are disclosed. The storage system includes a frame containing a plurality of stacks of containers, a first handling device capable of lifting a plurality of containers from a stack in a single operation, and a second independently moveable handling device capable of lifting a single container and moving the container laterally. The first and second handling devices can work together to remove a target container quickly and with minimum use of resources.

8 Claims, 16 Drawing Sheets

(56) References Cited

U.S. PATENT DOCUMENTS

| | | |
|---|---|---|
| 2006/0056951 A1 | 3/2006 | Williamson |
| 2008/0075569 A1* | 3/2008 | Benedict ............... B65G 1/0464 414/269 |
| 2014/0017052 A1 | 1/2014 | Honkanen et al. |

FOREIGN PATENT DOCUMENTS

| | | |
|---|---|---|
| NO | 317366 B1 | 10/2004 |
| WO | WO 98/49075 A1 | 11/1998 |
| WO | WO 2012/127102 A1 | 9/2012 |

OTHER PUBLICATIONS

Written Opinion (PCT/ISA/237) dated Aug. 1, 2013, by the European Patent Office as the International Searching Authority for International Application No. PCT/GB2013/051215.

* cited by examiner

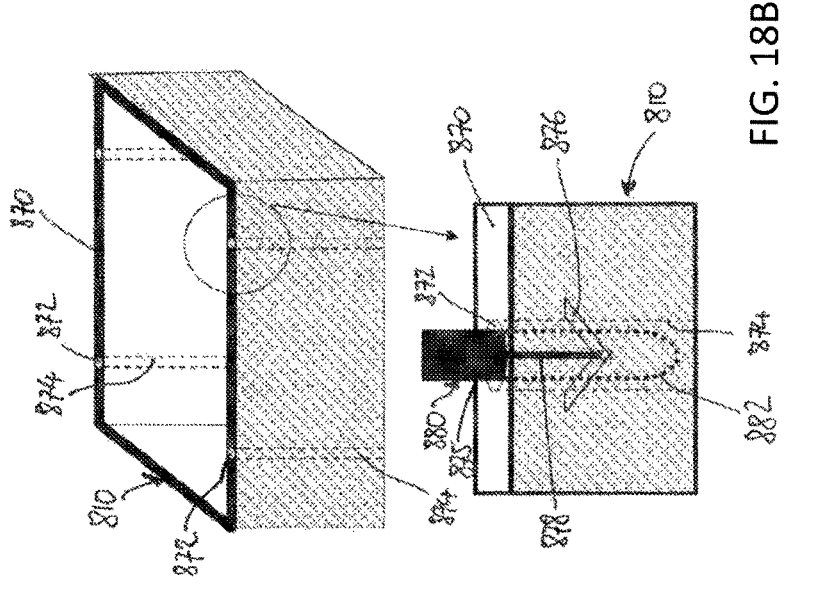
FIG. 18A
FIG. 18B
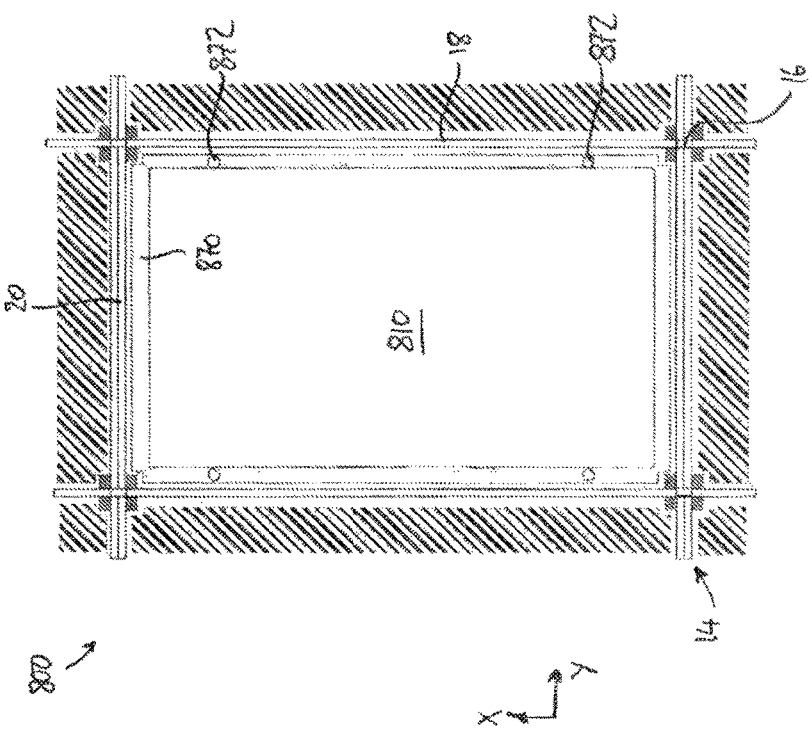
FIG. 17

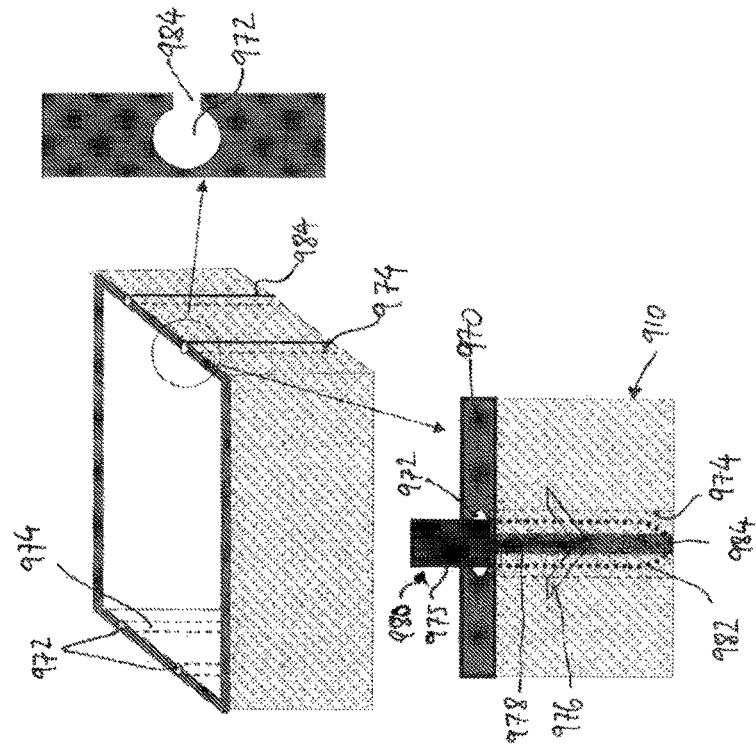
FIG. 20A
FIG. 20B
FIG. 20C
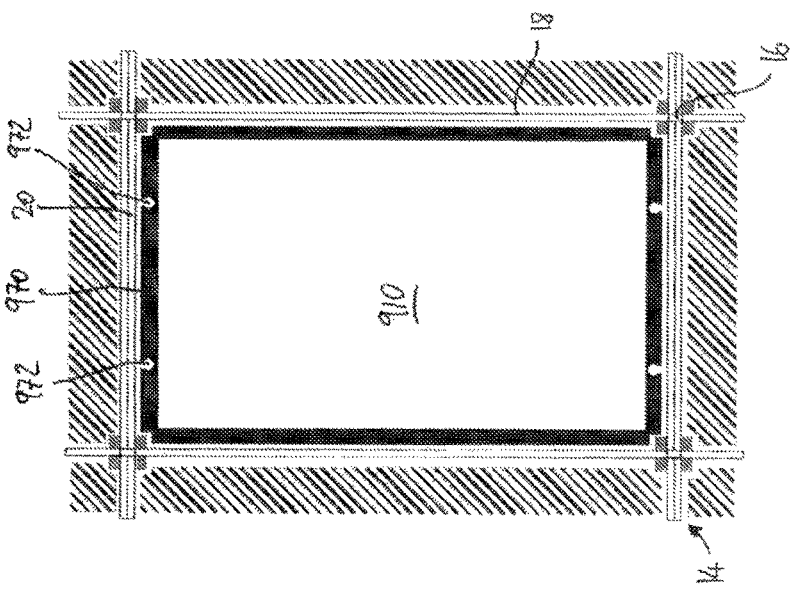
FIG. 19

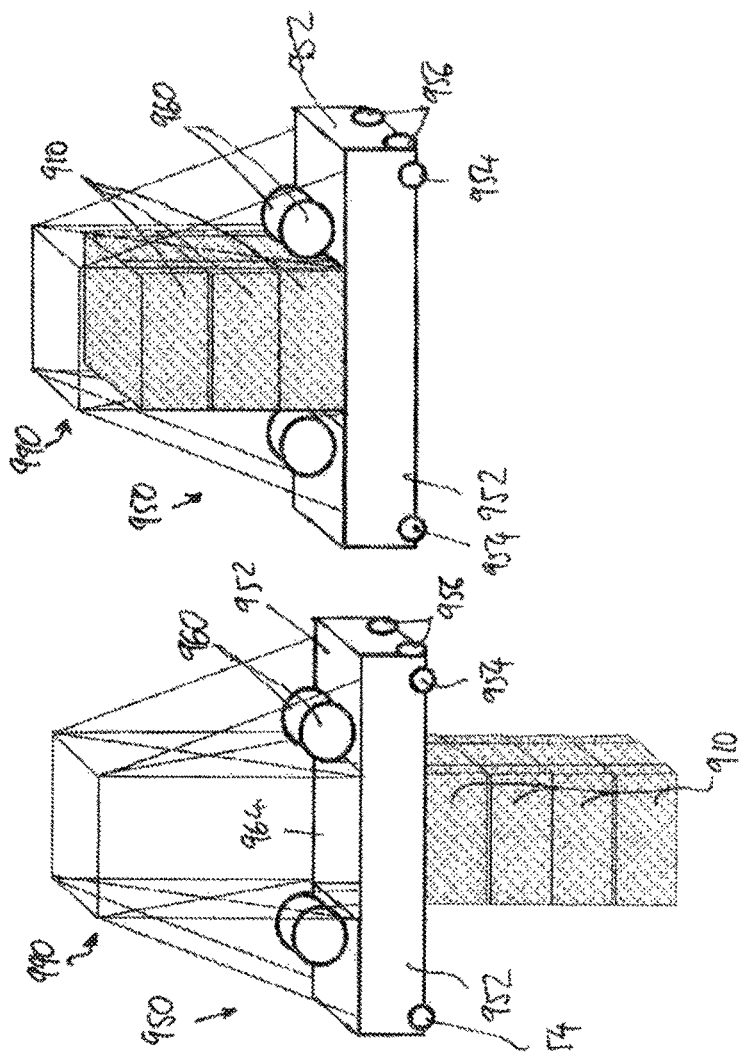

STORAGE SYSTEMS AND METHODS FOR RETRIEVING UNITS FROM A STORAGE SYSTEM

FIELD OF THE INVENTION

The present invention relates to storage systems and methods for retrieving units form a storage system. In particular, but not exclusively, the invention relates to a robotic system for handling bins in a store comprising a grid of stacked units.

BACKGROUND TO THE INVENTION

Some commercial and industrial activities require systems that enable the storage and retrieval of a large number of different products. One known system for the storage and retrieval of items in multiple product lines involves arranging storage bins or containers on rows of shelves arranged in aisles. Each bin or container holds a plurality of products of one product type. The aisles provide access between the rows of shelves, so that the required products can be retrieved by operatives or robots that circulate in the aisles. It will be appreciated, however, that the need to provide aisle space to access the products means that the storage density of such systems is relatively low. In other words, the amount of space actually used for the storage of products is relatively small compared to the amount of space required for the storage system as a whole.

In an alternative approach, which offers a significant improvement in storage density, containers are stacked on top of one another and the stacks are arranged in rows. The containers are accessed from above, removing the need for aisles between the rows and allowing more containers to be stored in a given space.

Methods of handling containers stacked in rows have been well known for decades. In some such systems, for example as described in U.S. Pat. No. 2,701,065, free-standing stacks of containers are arranged in rows in order to reduce the storage volume associated with storing such containers while still providing access to a specific container if required. Access to a given container is made possible by providing relatively complicated hoisting mechanisms which can be used to stack containers and to remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B (Cimcorp). Cimcorp discloses a mechanism for removing a plurality of stacked containers using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack). The load handler can be used to move containers between single-product stacks, for example to add a plurality of containers containing a single type of product to the store, and to pick up one or more containers from two or more single-product stacks to create a multi-product output stack. An example of this is the picking of vegetable crates in a central warehouse to create a multi-product order for delivery to retail stores.

In the system described in Cimcorp, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler. Furthermore, the system is not well adapted for the selection of a single container from a multi-product stack.

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

Accordingly, for some applications, the use of multi-product stacks, in which the containers making up each stack may hold different products, is favoured in order to maximise the storage density of the system. The stored items must remain accessible reasonably quickly and easily, so that a plurality of different items required to fulfil a customer order can be picked from the storage system in an efficient way, even if some of the items required are stored in a lower level of a stack, underneath several other containers.

International patent application WO 98/049075A (Autostore), the contents of which are incorporated herein by reference, describes a system in which multi-product stacks of containers are arranged within a frame structure. A system of this type is illustrated schematically in FIGS. 1 to 5 of the accompanying drawings.

As shown in FIGS. 1 and 2, stackable containers, known as bins 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 12.

The load handling devices 30 are further described in Norwegian patent number 317366, the contents of which are incorporated herein by reference. FIGS. 3A and 3B are schematic perspective views of a load handling device 30 from the rear and front, respectively, and FIG. 3C is a schematic front perspective view of a load handling device 30 lifting a bin 10.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

The load handling device 30 is equipped with a crane device 40. The crane device 40 comprises a cantilever arm 42 that extends laterally from the top of the vehicle 32. A gripper plate 44 is suspended from the cantilever arm 42 by four cables 46. The cables 46 are connected to a winding mechanism (not shown) housed within the vehicle 32. The cables 46 can be spooled in or out from the cantilever arm 42, so that the position of the gripper plate 44 with respect to the vehicle 32 can be adjusted in the Z direction.

The gripper plate 44 is adapted to engage with the top of a bin 10. For example, the gripper plate 44 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 44, which is powered and controlled by signals carried through the cables 46 themselves or through a separate control cable (not shown).

To remove a bin 10 from the top of a stack 12, the load handling device 30 is moved as necessary in the X and Y directions so that the gripper plate 44 is positioned above the stack 12. The gripper plate 44 is then lowered vertically in the Z direction to engage with the bin 10 on the top of the stack 12, as shown in FIG. 3C. The gripper plate 44 grips the bin 10, and is then pulled upwards on the cables 46, with the bin 10 attached. At the top of its vertical travel, the bin 10 is accommodated beneath the cantilever arm 42 and is held above the level of the rails 22. In this way, the load handling device 30 can be moved to a different position in the X-Y plane, carrying the bin 10 along with it, to transport the bin 10 to another location. The cables 46 are long enough to allow the load handling device 30 to retrieve and place bins from any level of a stack 12, including the floor level. The vehicle 32 is sufficiently heavy to counterbalance the weight of the bin 10 and to remain stable during the lifting process. The weight of the vehicle 32 may be comprised in part of batteries that are used to power the drive mechanism for the wheels 34, 36.

As shown in FIG. 4, a plurality of identical load handling devices 30 are provided, so that each load handling device 30 can operate simultaneously to increase the throughput of the system. The system illustrated in FIG. 4 includes two specific locations, known as ports 24, at which bins 10 can be transferred into or out of the system. An additional conveyor system (not shown) is associated with each port 24, so that bins 10 transported to a port 24 by a load handling device 30 can be transferred to another location by the conveyor system, for example to a picking station (not shown). Similarly, bins 10 can be moved by the conveyor system to a port 24 from an external location, for example to a bin-filling station (not shown), and transported to a stack 12 by the load handling devices 30 to replenish the stock in the system.

Each load handling device 30 can lift and move one bin 10 at a time. If it is necessary to retrieve a bin 10 ("target bin") that is not located on the top of a stack 12, then the overlying bins 10 ("non-target bins") must first be moved to allow access to the target bin 10. This is achieved in an operation referred to hereafter as "digging".

Referring to FIG. 5, during a digging operation, one of the load handling devices 30 sequentially lifts each non-target bin 10a from the stack 12 containing the target bin 10b and places it in a temporary location on top of another stack 12. The target bin 10b can then be accessed by the load handling device 30 and moved to a port 24 for further transportation. In FIG. 5, eight non-target bins 10a have been placed into temporary positions, and the target bin 10b has been withdrawn from the stack 12 by the load handling device 30. Once the target bin 10b has been extracted, the non-target bins 10a can be replaced one-by-one in the stack 12 by the load handling device 30, to restore the original order of the stack 12, less the target bin 10b.

Each of the load handling devices 30 is under the control of a central computer. Each individual bin 10 in the system is tracked, so that the appropriate bins 10 can be retrieved, transported and replaced as necessary. For example, during a digging operation, the temporary locations of each of the non-target bins 10a is logged, so that the non-target bins 10a can be replaced in the stack in the correct order.

The system described with reference to FIGS. 1 to 5 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

However, there are some drawbacks with such a system, which all result from the above-described digging operation that must be performed when a target bin 10b is not at the top of a stack 12.

In a typical installation, the stacks 12 can be up to twenty-four bins tall. This means that, to access a target bin 10b that is towards the bottom of the stack 12, it is necessary first to remove a large number of non-target bins 10a. As shown in FIG. 5, the non-target bins 10a stored in temporary locations restrict access to the rails 22, making a relatively large area of the store inaccessible to other load handling devices 30 during a digging operation. Furthermore, the digging process consumes a large part of the operating time of the load handling devices 30, reducing the efficiency and increasing the cost of the system, because it is necessary to provide multiple load handling devices 30 to avoid delays.

The digging operation is relatively slow, and it can take many minutes to access a target bin 10b that is situated towards the bottom of a stack 12. The time taken is increased when the target stack 12 is already being used for temporary storage of a non-target bin 10a as part of the digging operation for another target bin 10b. Thus multiple digging operations have a cumulative negative effect on the efficiency of the system. To mitigate delays caused by digging operations, the picking process needs to be orchestrated a long time in advance, typically at least thirty minutes. As a result, the system cannot react quickly to changes in demand without significant loss of productivity.

Another strategy for minimising the time spent on digging operations is to arrange the bins 10 in the stack 12 so that the most frequently accessed bins 10 are close to the top of the stacks 12. However, this approach becomes limited in applications in which products are picked to assemble orders that consist of a relatively large number of products selected from a very large number of product lines, because it is always likely that a small number of comparatively rarely-ordered products, requiring a time-consuming digging operation, will be present in each order.

Against this background, it would be desirable to provide systems and methods that reduce or mitigate some of the above-described problems.

SUMMARY OF THE INVENTION

According to a first aspect, the present invention resides in a storage system comprising a frame containing a plurality of stacks of containers, a first handling device capable of lifting a plurality of containers from a stack in a single operation, and a second handling device capable of lifting a single container and moving the container laterally. The first and second handling devices are disposed above the frame and are independently moveable to access different stacks.

The provision of a first handling device capable of lifting a plurality of containers from a stack in a single operation along with a second handling device capable of lifting a single container and moving the container laterally provides an optimum solution when seeking to retrieve a container which is located in the middle or bottom of a stack. In such a case, only two lifting operations need be carried out to retrieve the target container, which greatly increases the speed and efficiency of the retrieval process compared to prior art arrangements in which only one container can be lifted at a time.

To this end, the first handling device may be configured to lift a plurality of non-target containers from a stack containing a target container. The second handling device may be configured to lift the target container from the stack and to move the target container to a destination. Preferably, the first and second handling devices are different from each other and dedicated to their specific function. By providing dedicated handling devices to lift non-target containers and target containers, each device can be designed to perform its role in the most efficient manner, increasing the productivity of each device and therefore the speed of operation of the whole system.

Once the target container has been lifted vertically from the stack, it can then be moved laterally (i.e. generally horizontally or sideways across the top of the stack) by the second handling device to another location at which the container can be transported away from the storage system for further processing. For example, when used in an order fulfillment operation, the target container may be moved from the storage system to an order picking station at which items are removed from containers to assemble customer orders.

The first handling device may be capable of moving the plurality of containers laterally. In one embodiment, the first handling device may be configured to move the plurality of containers to a temporary location. In this way, the plurality of containers can be moved aside to allow the second handling device to access a particular target container in the stack. By moving the plurality of containers together to the temporary location in a single operation, the number of container movement operations required to allow access to the target container can be significantly reduced compared to known systems in which only one container is moved at a time.

In one embodiment, the first handling device is configured to move the plurality of containers laterally, across the top of the frame, to the temporary location. The temporary location may be the top of a stack. For example, when the plurality of containers is removed from a target stack, the plurality of containers may be moved to the top of a non-target stack in the vicinity of the target stack.

Conveniently, lateral movement of the second handling device may be guided by rails disposed above the frame. The rails may be arranged in a grid pattern, allowing two-dimensional movement of the second handling device in the horizontal plane. The second handling device may comprise powered wheels arranged to engage with the rails. Two sets of wheels may be provided, with one set being arranged to engage with a first set of rails to guide movement of the second handling device in a first direction, and another set being arranged to engage with a second set of rails to guide movement of the second handling device in a second direction.

In one embodiment, lateral movement of the first handling device is also guided by rails disposed above the frame. In this case, the first handling device may comprise powered wheels arranged to engage with the rails. Again, two sets of wheels may be provided, with one set being arranged to engage with a first set of rails to guide movement of the first handling device in a first direction, and another set being arranged to engage with a second set of rails to guide movement of the first handling device in a second direction.

The first and second handling devices may be moveable in the same horizontal plane above the frame. For example, the first and second handling devices may be guided on a common set of rails.

In alternative arrangements, the first handling device is moveable in a first horizontal plane above the frame, and the second handling device is movable in a second horizontal plane that lies between the first horizontal plane and the frame. In this way, non-target containers can be lifted from a stack in a single operation by the first handling device and held in an elevated position whilst the second handling device retrieves a target container from the stack.

In one such case, the storage system comprises a lower set of rails arranged above the frame for guiding the second handling device, and an upper set of rails arranged above the lower set of rails for guiding the first handling device. In another arrangement, the storage system includes a gantry to guide lateral movement of the first handling device above the frame. The second handling device may be able to move beneath the gantry.

The first handling device may comprise a robot vehicle equipped with a lifting device arranged to lift the plurality of containers from the stack in a single operation. The lifting device may be configured to grip or engage with a lowermost one of the plurality of containers.

The vehicle of the first handling device may include an aperture through which the plurality of containers can be lifted. This provides for a compact, space-efficient arrangement.

In one embodiment, the aperture is open to a side of the vehicle to allow the first load handling device to move laterally away from the plurality of containers, once the plurality of containers have been placed in a temporary location. In another embodiment, the aperture is arranged centrally within the vehicle, in which case the plurality of containers may be retained by the first load handling device until the plurality of containers is lowered back onto a stack.

The lifting device may comprise one or more lifting arms. When an aperture is provided, a pair of lifting arms may be arranged on either side of the aperture. The lifting arms may be telescopic.

The storage system may comprise vertically-extending spaces between the stacks of containers and the frame to allow the lifting arms to embrace the plurality of containers therebetween. Whilst the inclusion of such spaces in the storage system reduces the storage density of the storage system, this disadvantage is more than compensated for by the significant improvement in efficiency and speed of operation afforded by the present invention.

In another embodiment, the lifting device comprises rods or cables arranged to engage with vertical channels formed in the side walls of the containers. The channels may be accessed by apertures in a top face of each container. In such an arrangement, vertically-extending spaces in the storage system are not necessary.

The rods or cables may carry an anchor mechanism arranged to engage releasably with a container. For example, the anchor mechanism may comprise one or more laterally-extendable arms for engaging a surface of the container. The anchor mechanism may be operated remotely, for example by a wire that extends through a tubular bore of the rod or cable.

The channels may be open to the sides of the containers, to allow the rods or cables to be drawn outwards from the channels when the plurality of containers is lifted. The lifting device may comprise one or more spool devices configured to extend and retract the rods or cables. The channels may extend through the whole height of each container, so that the rods or cables can be lowered through a plurality of containers to reach and engage with the lowest container of a plurality of containers to be lifted.

The first handling device may comprise a support frame for supporting a plurality of lifted containers. In this way, the lifted containers remain stable when the first handling device is moved, even if the containers are unevenly loaded or misaligned. Similarly, when the first handling device comprises lifting arms, the lifting arms may support and stabilise the containers when in the lifted position.

The second handling device may comprise a robot vehicle equipped with a crane device. As is known from NO317366, for example, the crane device may be supported by a cantilever arm extending from the vehicle.

In an alternative arrangement, the vehicle comprises first and second vehicle modules that support the crane device therebetween. For example, the first and second vehicle modules may be spaced apart to define a space therebetween into which the container can be lifted. The first and second vehicle modules may be linked by a cross member from which the crane device is suspended. In these arrangements, the weight of the crane device and the container is supported directly by the vehicle modules and it is not necessary for the weight of the vehicle to act as a counterbalance. Consequently, the weight of the second handling device according to this arrangement can be significantly reduced compared to the known cantilever-type device.

The crane device may include a gripper device configured to grip a container from above. The gripper device may be suspended from cables that can be extended and retracted from the vehicle to move the gripper device vertically.

In another embodiment, the second handling device comprises a robot vehicle equipped with a lifting device arranged to lift a single container from the stack. The vehicle of the second handling device may include an aperture through or into which the container can be lifted. The lifting device may comprise a pair of lifting arms arranged on either side of the aperture, in which case the lifting device may comprise a gripper device mounted between the ends of the arms and arranged to grip a container from above.

The frame may comprise upright members and horizontal members arranged to guard against lateral movement of the stacks contained in the frame, and to guide vertical movement of the containers. By forming the stacks of containers within a frame in this way, several advantages are realised. For example, each stack can be taller than would be possible in the absence of a frame. Using tall stacks provides both good utilisation of the space within a building, and leads to short horizontal travel distances for the transport of containers into and out of the storage system. The frame also provides stability for the stacks of containers, even if the containers are unevenly loaded, misaligned, or of slightly different shapes due to manufacturing tolerances. Thirdly, the frame can also guide the first and second handling devices so that they can be made lighter, faster and cheaper.

The storage system may further comprise one or more port locations at which containers can be removed from and/or added to the storage system. The second handling device may be capable of transporting a target container from a stack to a port location.

The containers may comprise open-topped bins. The containers may be arranged to interlock or engage with one another in the vertical direction when formed in a stack. As well as increasing the stability of the stacks within the frame, using containers that interlock or engage with one another in the vertical direction improves the stability of sets of containers that are lifted together from the stacks.

In a typical application, multiple handling devices may be employed so that multiple containers can be lifted and moved simultaneously. The handling devices may be of different types, and may be selected to balance the cost and energy consumption of the system with the speed and flexibility of operation.

To this end, the storage system may comprise a plurality of first handling devices, each being capable of lifting a plurality of containers from a stack in a single operation. Two or more of the plurality of first handling devices may be of the same type. Alternatively, or in addition, at least one first handling device of a first type, and at least one first handling device of a second type may be provided.

For example, the first handling device of the first type may be capable of lifting more containers in one operation than the first handling device of the second type. In this way, the first handling device of the first type can be used to lift non-target containers from stacks in which a target container is located towards the bottom of the stack, underneath a relatively large number of non-target containers, whilst the first handling device of the second type, which is cheaper, lighter and consumes less energy than the first handling device of the first type, can be used to lift non-target containers from the stacks in which the target container is located closer to the top of the stack.

In another example, the first handling device of the first type is capable of depositing the plurality of containers in a temporary location, for example on top of a stack, whilst the first handling device of the second type retains the plurality of containers until they are replaced in the original stack. This arrangement provides a balance between functionality and cost, and is useful in applications where it is not necessary for all of the first handling devices to be capable of leaving the plurality of containers in a temporary location.

A plurality of second handling devices may be provided. Two or more of the second handling devices may be identical.

The present invention also extends, in a second aspect, to a handling device for lifting and moving containers in a storage system, wherein the handling device is suitable for use as the first handling device in the storage system of the first aspect of the invention.

The invention further extends, in a third aspect, to a handling device for lifting and moving containers in a storage system, wherein the handling device is suitable for use as the second handling device in the storage system of the first aspect of the invention.

From a fourth aspect, the invention resides in a method of retrieving a target container from a storage system, the storage system comprising a plurality of stacks of containers arranged in a frame, wherein the target container is located in a target stack beneath at least two non-target containers. The method comprises moving a first handling device to the target stack, lifting a plurality of non-target containers from the target stack in a single lifting operation using the first handling device to allow access to the target container, moving a second handling device to the target stack, and lifting the target container from the target stack using the second handling device.

By virtue of this method, the target container can be retrieved using only two lifting operations, and the amount of time spent by a handling device in moving the non-target containers to allow access to the target container can be substantially reduced. The first and second handling devices are preferably different and are dedicated to their specific function.

The first handling device need not remove all of the non-target containers in one lifting operation. Thus the method may include lifting multiple pluralities of non-target containers in consecutive single operations to allow access to the target container.

The method may further comprise transporting laterally the plurality of non-target containers to a temporary location using the first handling device, before moving the second handling device to the target stack. The plurality of non-target containers may be deposited at the temporary location or, alternatively, the plurality of non-target containers may be retained in the first handling device at the temporary location. In this case, the method may comprise moving the second handling device underneath the first handling device to access the target stack.

From a fifth aspect, the invention resides in a method of retrieving a target container from a storage system, the storage system comprising a plurality of stacks of containers arranged in a frame, wherein the target container is located in a target stack beneath at least two non-target containers. The method comprises moving a first handling device to the target stack, lifting a plurality of non-target containers and the target container from the target stack in a single lifting operation using the first handling device, transporting laterally the plurality of non-target containers and the target container to a temporary location using the first handling device, depositing the target container in the temporary location, removing the plurality of non-target containers from the temporary location, moving a second handling device to the temporary location, and lifting the target container from the temporary location using the second handling device.

In this aspect, the target container is lifted from the stack along with the overlying non-target containers. The non-target containers are then removed, allowing the second handling device to retrieve the target container. With this method, it is necessary only for the first handling device to be capable of reaching down into the frame to lift a container. The second handling device need be capable only of lifting the target container from the temporary location, for example from the top of a stack. Preferably, the plurality of non-target containers is removed from the temporary location in a single operation using the first handling device, minimising movement of the handling devices.

The method of the fourth or fifth aspect may include returning the plurality of non-target containers to the stack in a single operation using the first handling device.

According to a sixth aspect of the present invention there is provided an order picking system comprising a container frame containing a plurality of stacks of containers or bins, a first horizontal transport mechanism comprising a target bin retrieval robot and a second horizontal transport mechanism comprising a non-target bin retrieval robot capable of retrieving a plurality of non-target bins from a stack in a single operation, wherein the first and second transport mechanisms are different from each other and dedicated to their specific function and work together to retrieve a target bin efficiently.

More specifically, the first transport mechanism can be designed to retrieve one bin at a time from the top of a current stack, whereas the second transport mechanism can be designed to extract a plurality of non-target bins in a stack by use of for example telescopic arms which extend down to the desired level of the stack within the grid, engage the bin at the desired level and lift the entire stack of bins above the desired bin in a single operation. The ability to remove a stack of bins in a single operation from a grid provides an optimum solution when seeking to retrieve a bin which is located in the middle or bottom of a stack such that only two operations need be carried out to retrieve the target bin.

Preferably the bins are interlocking such that the retrieved stack has improved stability. Also there is no absolute need for the second transport mechanism to be able to remove all of the non-target bins in one operation. Whilst providing a non-optimum solution, it is possible for the second transport mechanism to extract a plurality of non-target bins in each operation and repeat this until the target bin is reached.

According to a seventh aspect of the present invention there is provided an order picking system comprising a container frame containing a plurality of stacks of containers or bins, a first horizontal transport mechanism comprising a target bin retrieval robot and a second horizontal transport mechanism comprising a non-target bin retrieval robot capable of retrieving a plurality of non-target bins from a stack in a single operation, wherein the first and second transport mechanisms are displaced from each other in separate planes.

In a proposed implementation, a stack of non-target bins on top of the required (target) bin would be picked up through the grid by means of the second horizontal transport mechanism which may have a second type of load handler with a telescopic gripping arms device, whereafter the required (target) bin would be retrieved using the first horizontal transport mechanism which may comprise a first type of moveable load handler. This would then transport the target bin to the required location.

In an eighth aspect of the invention, a storage system is provided comprising a frame containing a plurality of stacks of containers, and a handling device disposed above the frame and capable of lifting one or more containers from a stack in a single operation. The handling device comprises a plurality of flexible lifting cables, each lifting cable having an anchor mechanism to anchor the rod to a container, and drive means arranged to deploy and retract the lifting cables. Each container comprises a plurality of channels for accepting the lifting cables of the handling device. The channels open to side of each container to allow the lifting cables to be drawn outwards from the channels upon retraction of the lifting cables. The handling device may comprise a vehicle having an aperture through which the containers are lifted upon retraction of the lifting rods. The handling device may include a support frame for supporting a plurality of lifted containers.

A ninth aspect of the invention resides in a handling device suitable for lifting containers from a stack of containers in a frame structure. The handling device comprises a robot vehicle equipped with a crane device. The vehicle comprises first and second vehicle modules that support the crane device therebetween. The first and second vehicle modules may be spaced apart to define a space therebetween into which the container can be lifted. The first and second vehicle modules may be linked by a cross member from which the crane device is suspended. The crane device may comprise a gripper device configured to grip a container from above and the gripper device may be suspended from cables that can be extended and retracted from the vehicle to move the gripper device vertically.

A tenth aspect of the invention resides in a handling device suitable for lifting containers from a stack of containers in a frame structure, comprising a robot vehicle equipped with a lifting device arranged to lift a container from the stack. The vehicle includes an aperture through or into which the container can be lifted. The lifting device may comprise a pair of lifting arms arranged on either side of the aperture, and may further comprise a gripper device mounted between the ends of the arms and arranged to grip a container from above.

Aspects of the present invention are a substantial improvement of the system described in International Patent Application WO 98/49075 and further detailed in Norwegian patent 317366. In particular, the introduction of a second type of movable load handling device, which facilitates removal of a plurality of stacked non-target bins in a single operation, significantly increases the utility of the storage system.

Preferred and/or optional features of each aspect of the invention may be used, alone or in appropriate combination in the other aspects of the invention also.

BRIEF DESCRIPTION OF THE DRAWINGS

Embodiments of the present invention will now be described, by way of example only, with reference to the remainder of the accompanying drawings, in which like reference numerals are used for like features, and in which:

FIG. 17 is a schematic plan view of part of a frame structure forming part of another storage system according to the invention;

FIG. 18A is a schematic perspective view of a bin for use in the storage system of FIG. 17, and FIG. 18B is a more detailed view of part of the bin of FIG. 18A;

FIG. 19 is a schematic plan view of part of a frame structure forming part of a further storage system according to the invention;

FIG. 20A is a schematic perspective view of a bin for use in the storage system of FIG. 19, and FIGS. 20B and 20C are more detailed views of parts of the bin of FIG. 20A;

FIG. 21A is a schematic perspective view of a load handling device for use in the storage system of FIG. 6, and FIGS. 21B and 21C are schematic perspective views of the load handling device of FIG. 21A in use lifting a plurality of bins.

DETAILED DESCRIPTION OF EMBODIMENTS OF THE INVENTION

Figure 6:
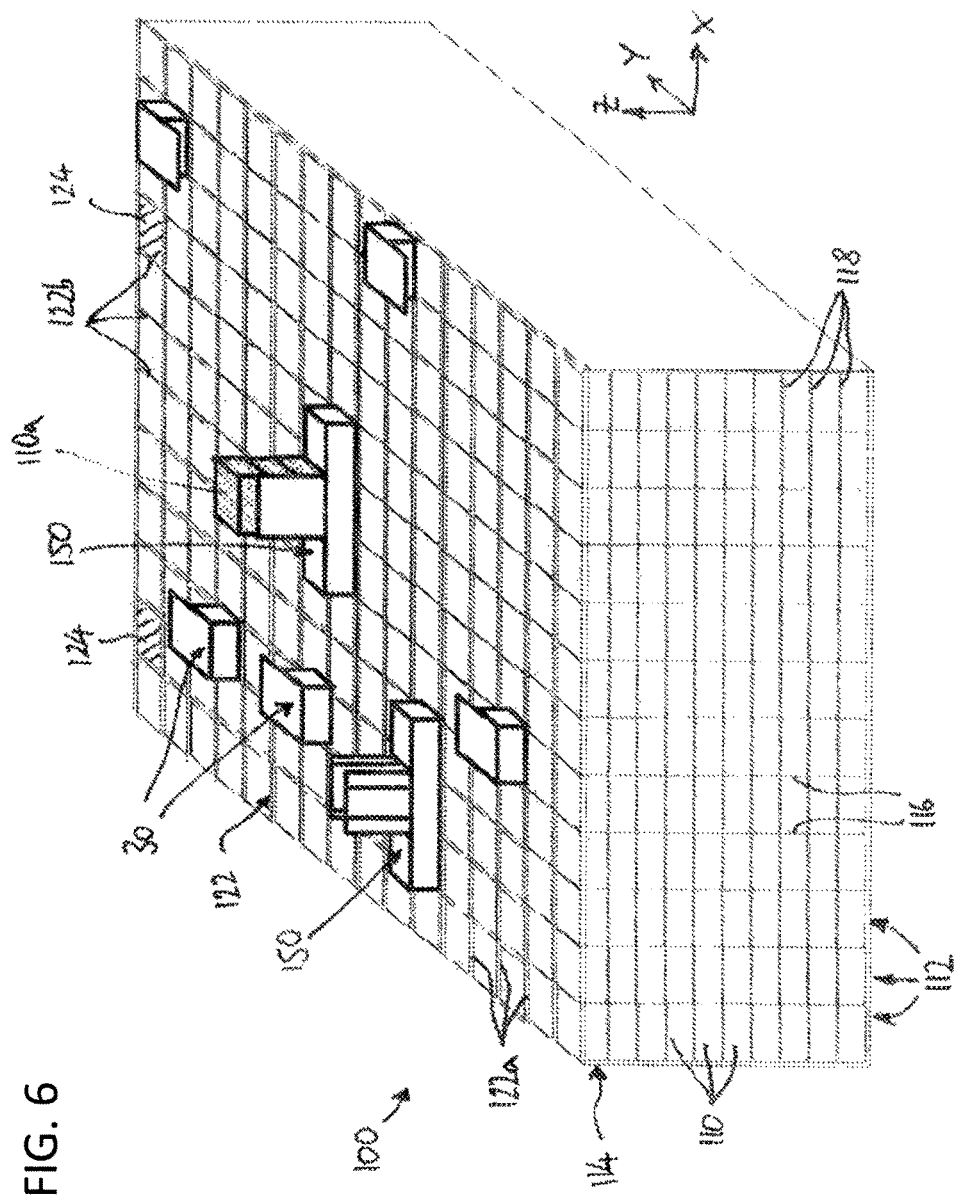
FIG. 6 is a schematic perspective view of a storage system according to one embodiment of the present invention.

FIG. 6 is a perspective view of a storage system 100 according to a first embodiment of the present invention. The storage system 100 is generally similar to the known system described above with reference to FIGS. 1 to 5, and comprises a plurality of storage containers or bins 110 stacked on top of one another to form a plurality of stacks 112. The stacks 112 are arranged within a frame structure 114.

The frame structure 114 comprises a plurality of upright members 116 that extend in the Z direction and support horizontal members 118, 120. A first set of parallel horizontal members 118, arranged in the X direction, is disposed perpendicular to a second set of parallel horizontal members 120 (not shown in FIG. 6), arranged in the Y direction. The horizontal members 118, 120 form a plurality of horizontal grid structures supported by the upright members 116. The members 116, 118, 120 are typically manufactured from metal. The bins 110 are stacked between the members 116, 118, 120 of the frame structure 114, so that the frame structure 114 guards against horizontal movement of the stacks 112 of bins 110, and guides vertical movement of the bins 110.

The top level of the frame structure 114 includes rails 122 arranged in a grid pattern across the top of the stacks 112. A first set 122a of parallel rails 122 and a second set 122b of parallel rails 122 are provided to guide movement of load handling devices in the X and Y directions, respectively, across the top of the frame structure 114.

Two different types of load handling device are mounted on the rails 122. The first type of load handling device 30, known hereafter as a single-bin load handling device, is identical to the known load handling device described above with reference to FIGS. 3 and 4. The second type of load handling device 150, known hereafter as a multi-bin load handling device, will now be described with reference to FIG. 7.

Referring to FIG. 7A, a multi-bin load handling device 150 comprises a vehicle 152 having first and second sets of wheels 154, 156 that are engageable with the first and second sets 122a, 122b of rails 122, respectively. As for the single-bin load handling device 30, the first and second sets of wheels 154, 156 of the multi-bin load handling device 150 can be moved vertically with respect to the vehicle 152 to engage or disengage the wheels 154, 156 from the corresponding set of rails 122a, 122b. By engaging and driving the appropriate set of wheels 154, 156, the multi-bin load handling device 150 can be moved laterally in the X and Y directions in the horizontal plane on the top of the frame structure 114.

The multi-bin load handling device 150 facilitates the removal of a plurality of non-target bins 110a from a stack 112 in a single operation. To this end, the vehicle 152 carries a telescopic lifting mechanism 160 consisting of two plate-like telescoping arms 162 arranged either side of a central aperture 164 in the vehicle 152. The ends of the arms 162 are fitted with gripper devices (not shown) that are configured to releasably engage with the bins 110. The gripper devices may take any suitable form, but may conveniently be in the form of inwardly-extending fingers that can be deployed laterally to engage with the rim of a bin 110 and retracted to release the bin 110.

As illustrated in FIG. 7B, to remove a plurality of non-target bins 110a from the top of a stack 112, the arms 162 are moved downwards so that the gripper devices on the ends of the arms 162 reach the lowermost bin 110a of the plurality of bins 110a to be removed. The gripper devices then engage the lowermost bin 110a, and the arms 162 are driven upwards to lift the plurality of bins 110a up through the aperture 164 and clear of the frame structure 114, as shown in FIG. 7C. The multi-bin load handling device 150 can then be moved, along with the set of bins 110a, to another location on the frame structure 114.

Figure 8:
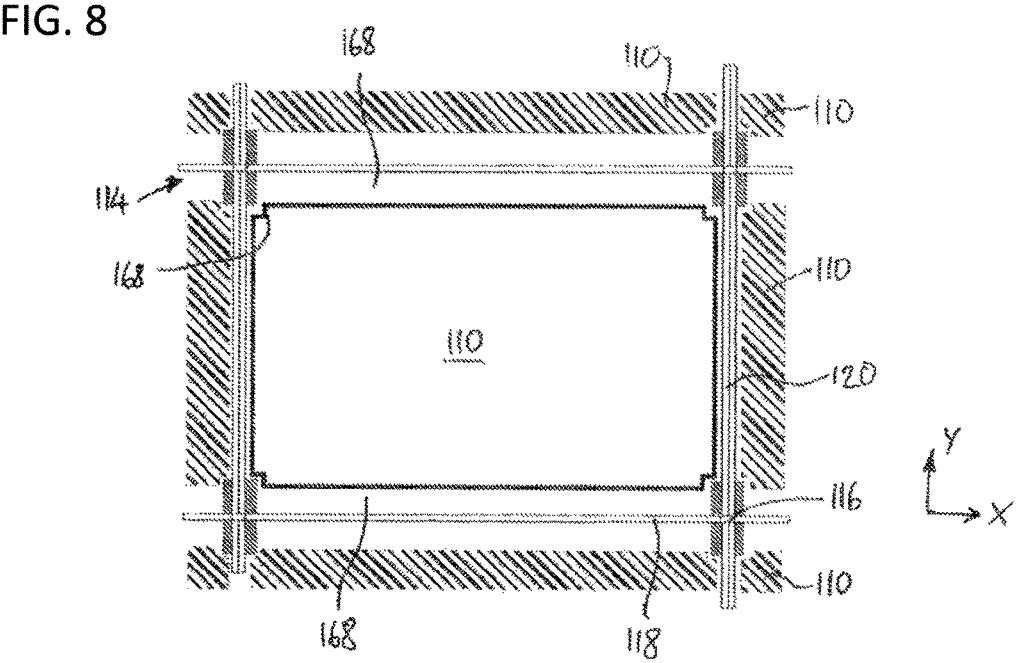
FIG. 8 is a schematic plan view of part of a frame structure forming part of the storage system of FIG. 6.

Referring to FIG. 8, in this embodiment of the invention, the members 118 of the frame structure 114 that extend in the X direction are spaced apart in the Y direction by a distance that is sufficient for the width of a bin 110 to be accommodated between the members 118 leaving a gap 168 either side of the bin 110. In this way, the arms 162 of a multi-bin load handling device 150 can pass between the bins 110 and the horizontal frame members 118. The bins 110 have recessed corners 168 that serve to locate the bins 110 between the vertical frame members 116. In this way, the vertical frame members 116 help to guide the bins 110 in vertical movement within the frame structure 114, and to maintain the stability of the stacks 112 even if the bins 110 are misaligned and/or unevenly loaded. The bins 110 may also be shaped so that they stack together in a mutually interlocking manner, as would be familiar to a person skilled in the art, thereby to improve the stability of the stacks 112. Interlocking could be established by any suitable means, such as pegs on the top rim of each bin 110 fitting into corresponding holes in the bottom of the overlying bin 110.

Referring back to FIG. 6, the multi-bin load handling devices 150 run on the same rails 122 as the single-bin load handling devices 30. The multi-bin load handling devices 150 are used primarily to remove non-target bins 110a from a stack, before a single-bin load handling device 30 removes the target bin 110b (not visible in FIG. 6) and transports the target bin 110b to a port 124 for further processing.

It will be appreciated that the multi-bin load handling devices 150 can be used to lift all of, or several of, the non-target bins 110a from a stack 112 in a single operation. This avoids the need for repeated single-bin removal operations to access a target bin 110b that is in a stack underneath non-target bins 110a. The removed non-target bins 110a can be retained, in the correct order, in the corresponding multi-bin load handling device 150 and moved out of the way of the stack 112 to allow a single-bin load handling device 30 to access the stack 112 to remove the target bin 110b, without the need to place the non-target bins 110a in individual temporary locations atop other stacks 112. The use of the multi-bin load handling devices 150 therefore keeps more stacks 112 accessible at any one time.

Operation of the storage system of FIG. 6 will now be described with reference to FIG. 9.

Figure 3:
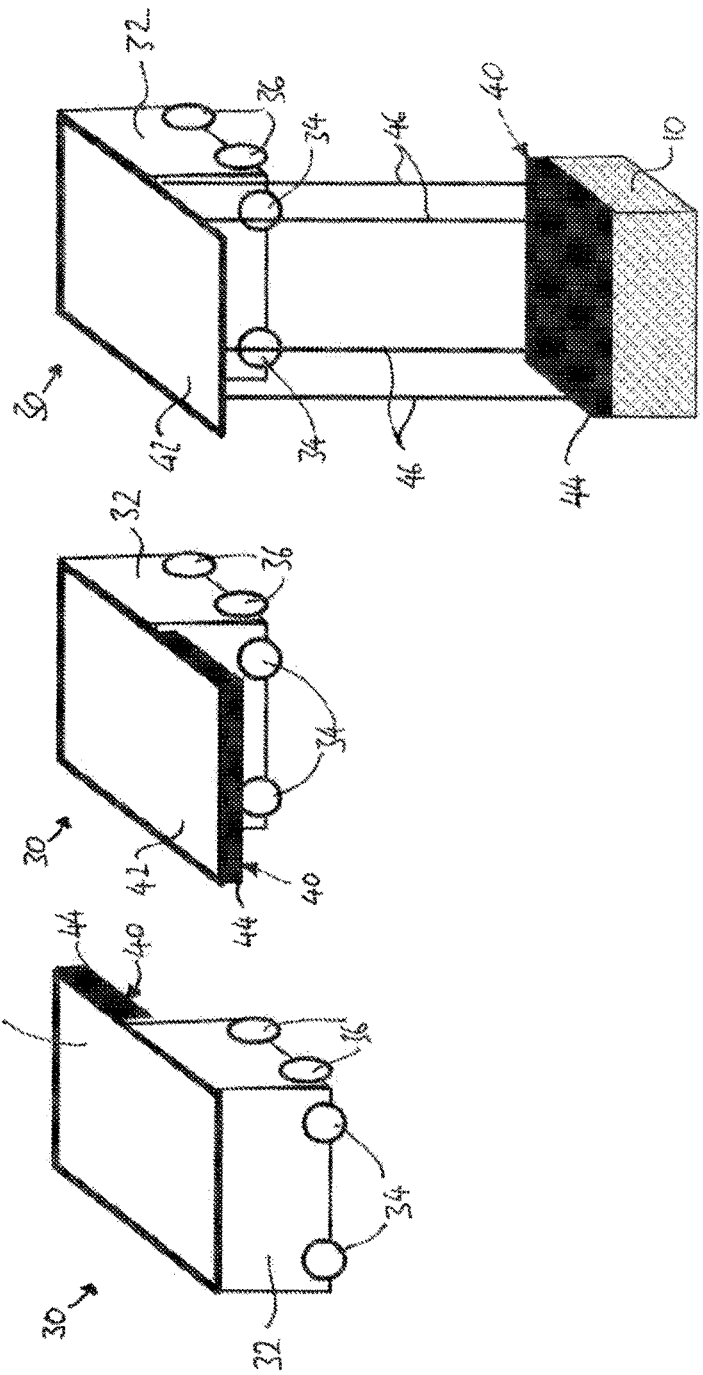
FIGS. 3A and 3B are schematic perspective views, from the rear and front respectively, of a known load handler device for use with the frame structure of FIGS. 1 and 2.
FIG. 3C is a schematic perspective view of the known load handler device in use lifting a bin.
Figure 4:
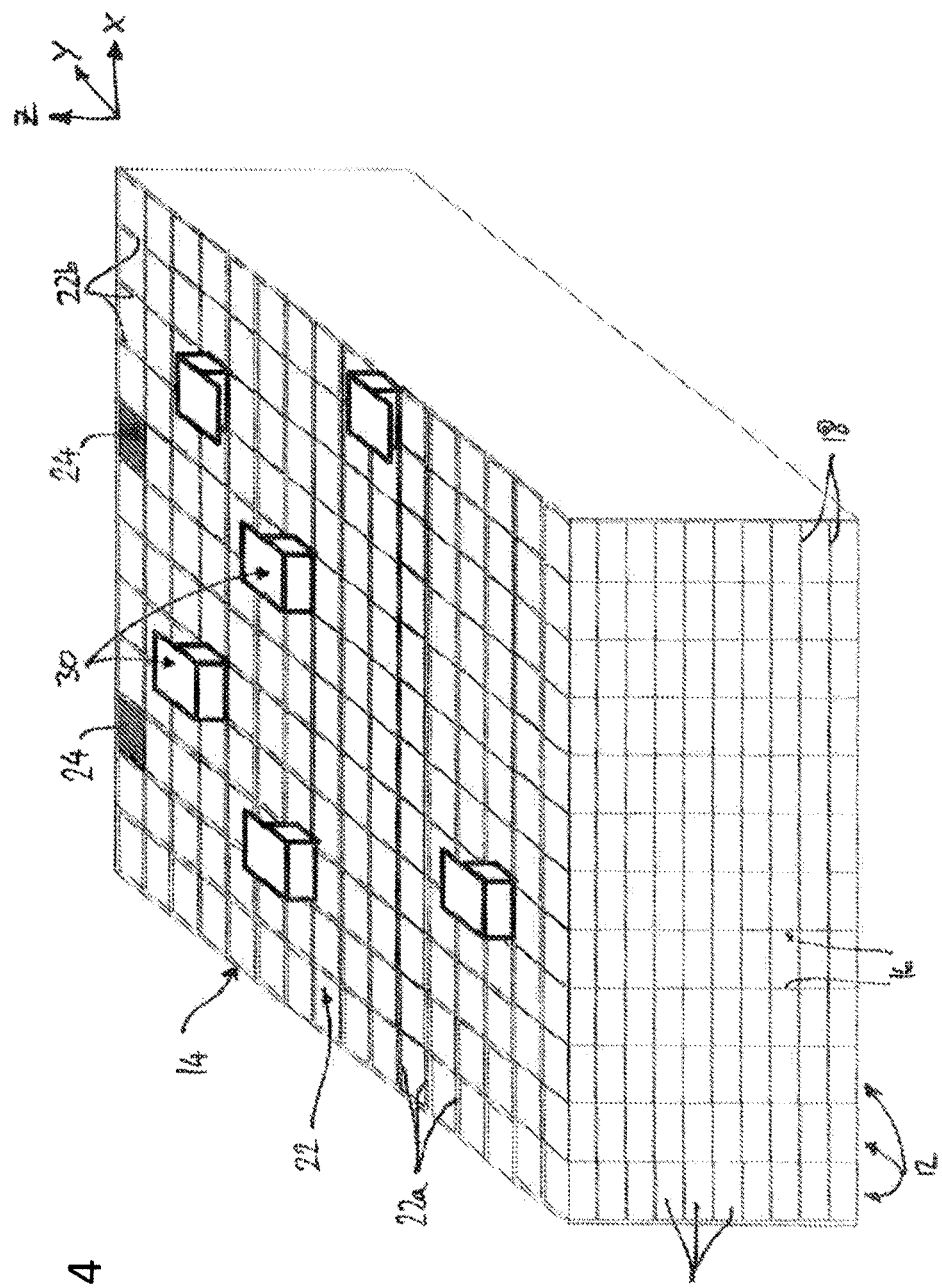
FIG. 4 is a schematic perspective view of a known storage system comprising a plurality of load handler devices of the type shown in FIGS. 3A, 3B and 3C, installed on the frame structure of FIGS. 1 and 2.
Figure 5:
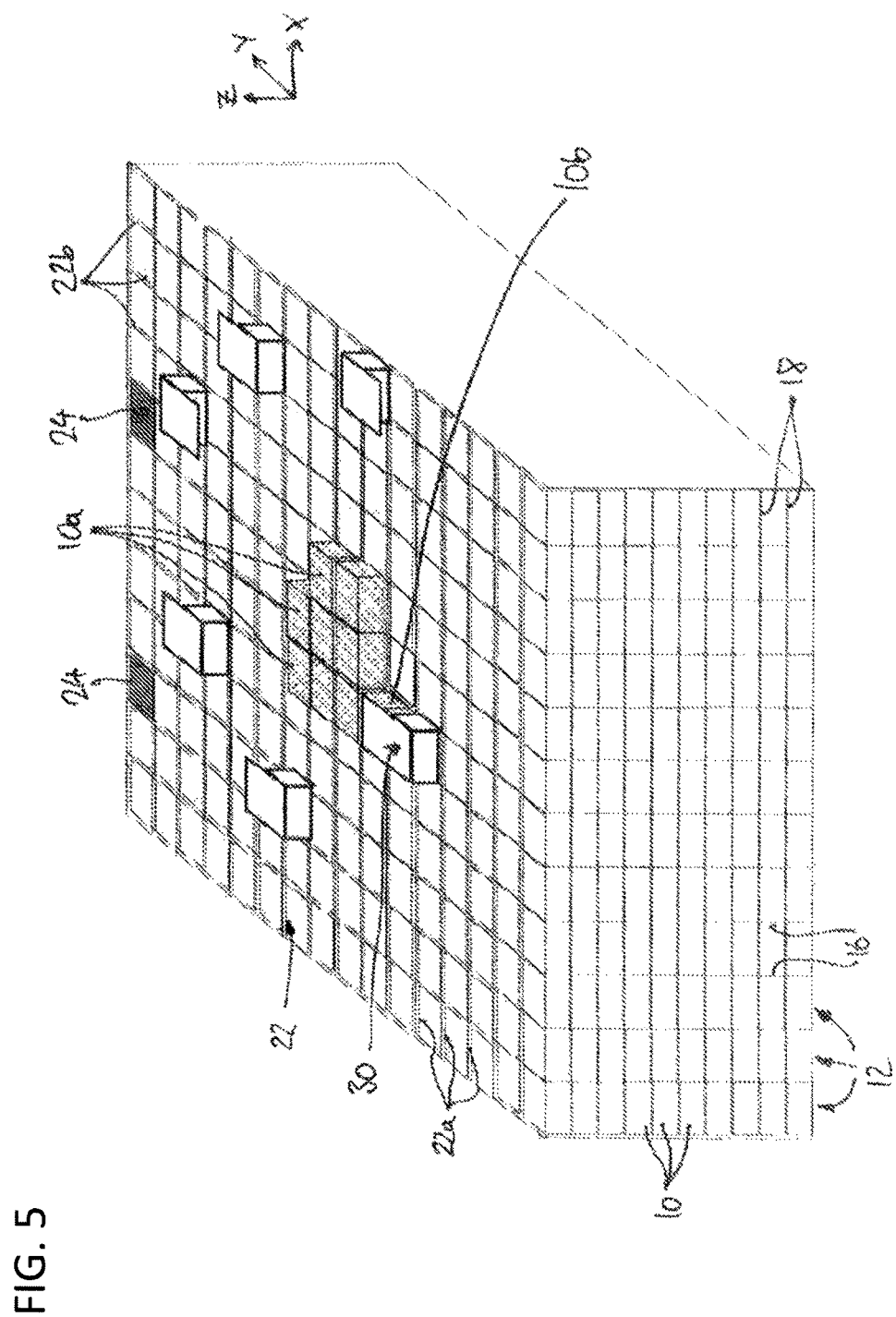
FIG. 5 is a schematic perspective view of the known storage system of FIG. 4 during a digging operation to retrieve a target bin from a stack.
Figure 7:
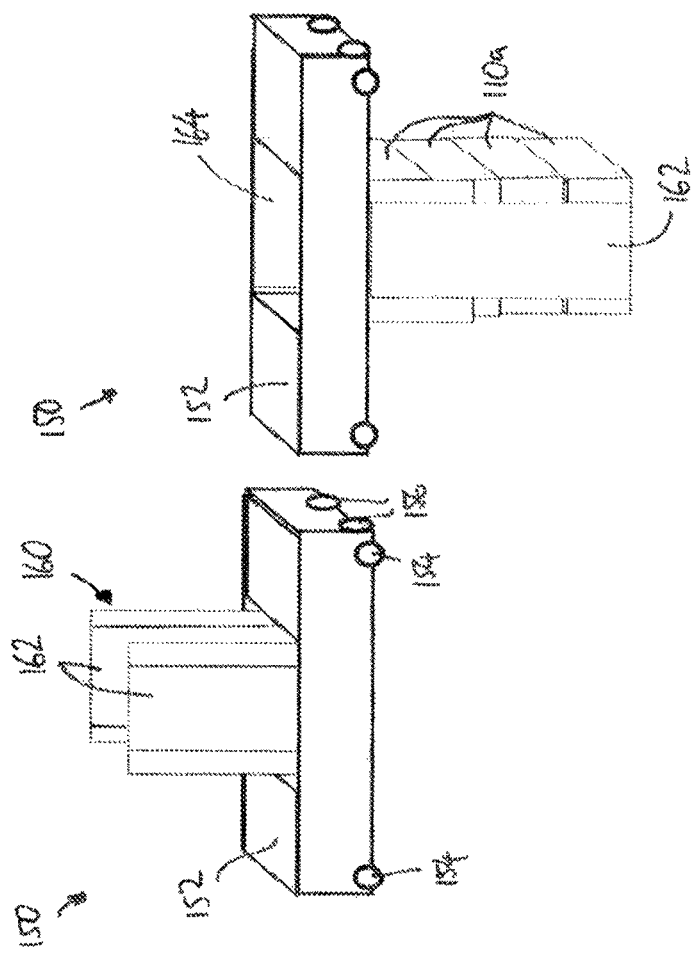
FIG. 7A is a schematic perspective view of a load handling device for use in the storage system of FIG. 6, and FIGS. 7B and 7C are schematic perspective views of the load handling device of FIG. 7A in use lifting a plurality of bins.

FIGS. 9A, 9B, 9C, 9D, 9E, 9F, 9G and 9H show schematic side views of stacks 112 of bins 110 arranged in the storage system 100 of FIG. 6, along with one single-bin load handling device 30, of the type shown in FIG. 3, and one multi-bin load handling device 150, of the type shown in FIG. 7. The load handling devices 30, 150 are moveable on rails 122, as previously described.

Figure 9A:
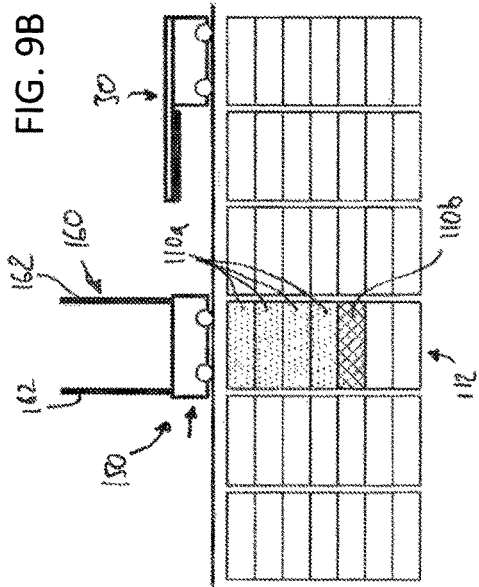
FIGS. 9A, 9B, 9C, 9D, 9E, 9F, 9G and 9H are a sequence of schematic side views of the storage system of FIG. 6, showing a bin being retrieved from a stack.
Figure 9B:
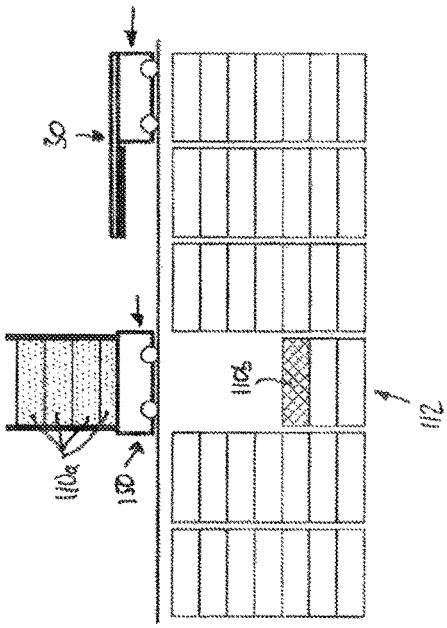
Figure 9C:
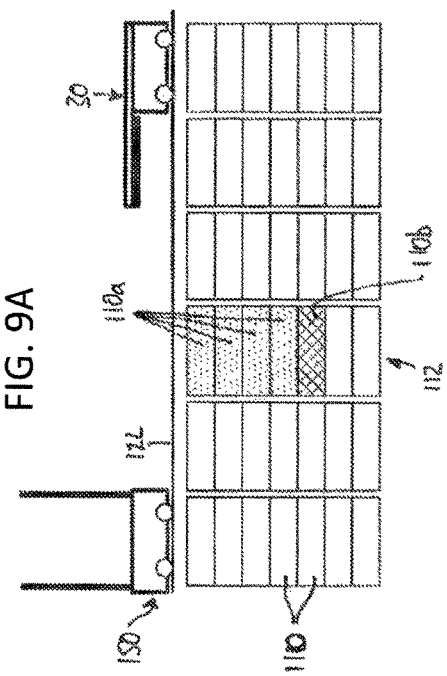
Figure 9D:
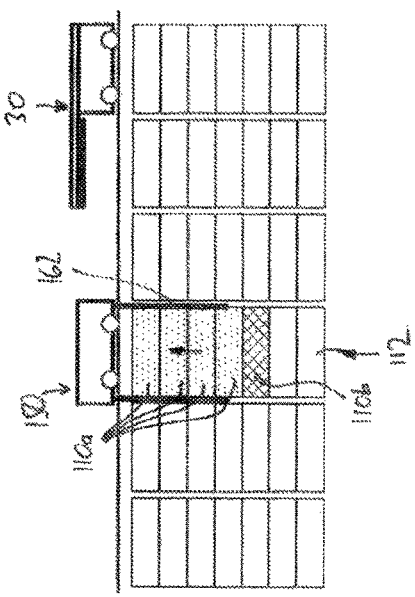

FIG. 9A illustrates the starting configuration of the system. A target bin 110b is located within one of the stacks 112, beneath a plurality of non-target bins 110a. To retrieve the target bin 110b, the multi-bin load handling device 150 is first moved into position above the stack 112 containing the target bin 110b, as shown in FIG. 9B. The arms 162 of the telescopic lifting mechanism 160 are then lowered to embrace the non-target bins 110a, as shown in FIG. 9C. The arms 162 grip the lowermost non-target bin 110a, and lift all of the non-target bins 110a clear of the stack, as shown in FIG. 9D.

Figure 9E:
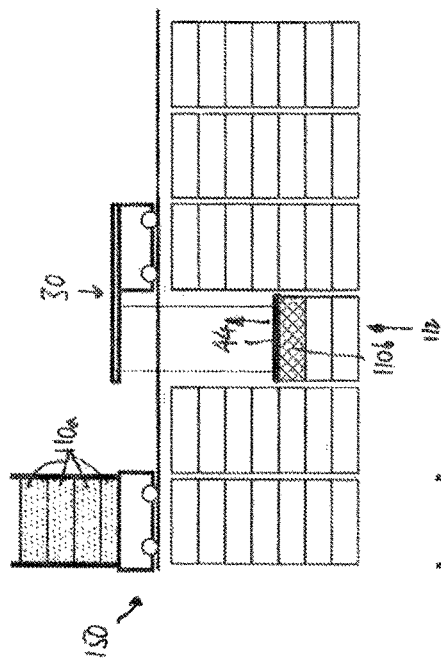
Figure 9F:
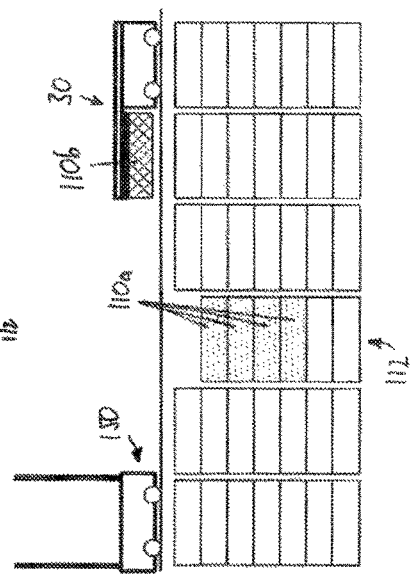
Figure 9G:
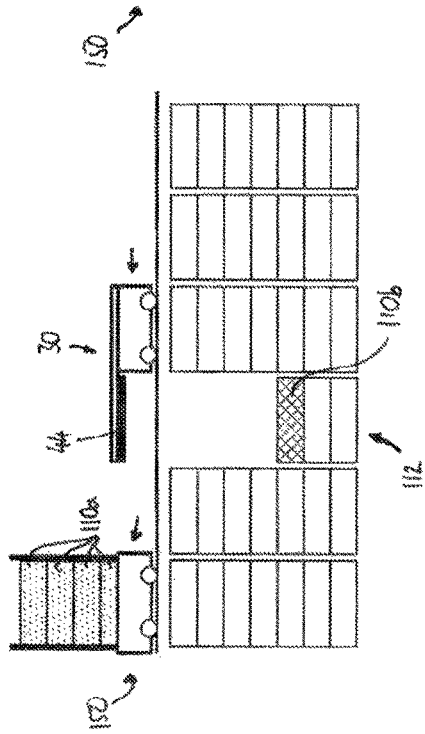
Figure 9H:
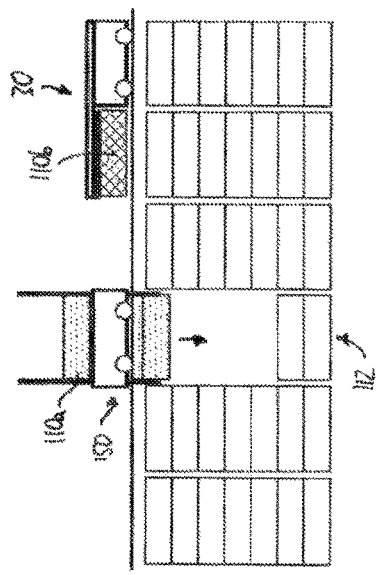

Turning to FIG. 9E, the multi-bin load handling device 150, holding the non-target bins 110a, moves away from the stack 112 in a lateral direction to expose the top of the target bin 110b. At the same time, a single-bin load handling device 30 moves laterally into position above the stack 112. The lifting plate 44 is lowered onto the target bin 110b and engaged therewith, as shown in FIG. 9F and then the lifting plate 44 is hoisted to lift the target bin 110b out of the stack 112.

The target bin 110b is then carried in a lateral or horizontal direction by the single-bin load handling device 30 to another location, for example a port (not shown), for further processing or transport. The multi-bin load handling device 150 moves back above the stack 112, and lowers the non-target bins 110a back onto the stack 112 (see FIG. 9G). Finally, the multi-bin load handling device 150 disengages the non-target bins 110a and moves away from the stack 112, leaving the stack 112 in its original configuration, less the target bin 110b.

The multi-bin load handling device 150 shown in FIG. 7 is small and relatively compact, but lacks the ability to deposit a set of non-target bins 110a in a temporary location on top of another stack 112. Instead, the non-target bins 110a are retained within the multi-bin load handling device 150. This means that each multi-bin load handling device 150 cannot be used for other tasks until the digging operation to access the target bin 110b is complete, and the non-target bins 110a have been returned to the original stack 112.

Figure 10:
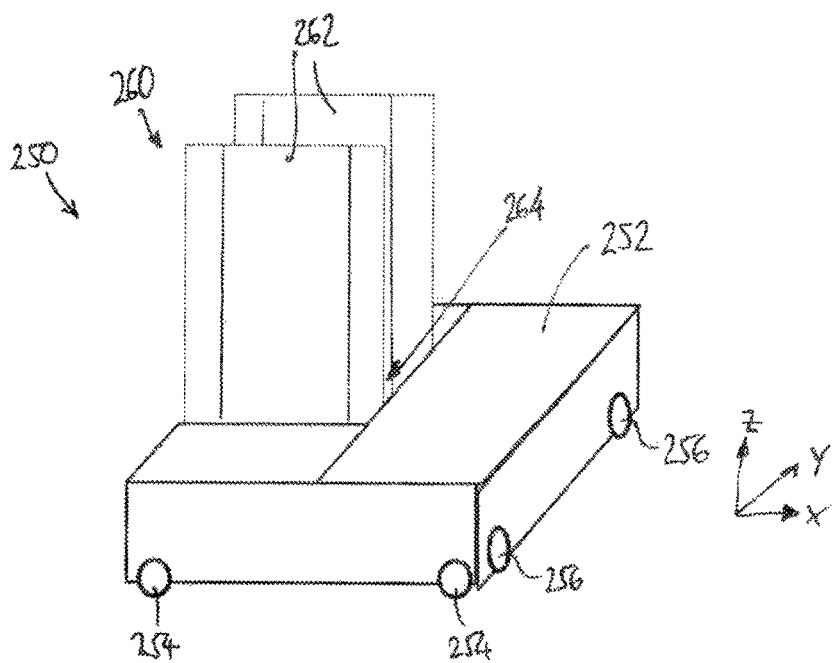
FIG. 10 is a schematic perspective view of another load handling device for use in a storage system according to another embodiment of the present invention.

FIG. 10 shows a variant of the multi-bin load handling device. In this case, the multi-bin load handling device 250 is capable of depositing a set of bins on top of another stack 112 and then moving away from the temporarily placed set of bins. The device 250 comprises a vehicle 252 with first and second sets of wheels 254, 256, arranged to engage with the first and second sets of rails 122a, 122b of the frame structure, as for the previously-described multi-bin load handling device 150.

The vehicle 252 is 'U' shaped in plan, having an aperture 264 that is open to one side of the vehicle 252. A telescopic lifting mechanism 260, substantially identical to that used in the previously-described multi-bin load handling device 150, is provided, with the two arms 262 of the lifting mechanism 260 arranged on either side of the aperture 264. In this way, a set of bins (not shown in FIG. 10) can be lifted from a stack 112 by the arms 262 through the aperture 264. The set of bins can then be placed on top of another stack 112. The lifting mechanism 260 can then disengage from the bins 110 and the device 250 can move away sideways (in the X direction, in this example) to leave the set of bins in place. The mutually interlocking shape of the bins 110 helps to maintain the stability of the temporarily-unsupported set of bins. The multi-bin load handling device 250 can then be used in another lifting operation, for example to remove another set of non-target bins from the same stack 112 or from another stack 112.

The multi-bin load handling device 250 of FIG. 10 can also be used in another mode of operation, in which the target bin 110b is retrieved by the device 250 along with one or more overlying non-target bins 110a. The set of bins 110, including the target bin 110b at the bottom of the set, can then be placed on another stack 112. The non-target bins 110a can then be immediately picked up again by the device 250 and returned to the original stack 112, leaving only the target bin 110b in place on top of another stack 112. The target bin 110b can then be retrieved by a single-bin load handling device 30, or by the same or a different multi-bin load handling device 250, and moved to another location, such as a port.

Figure 11:
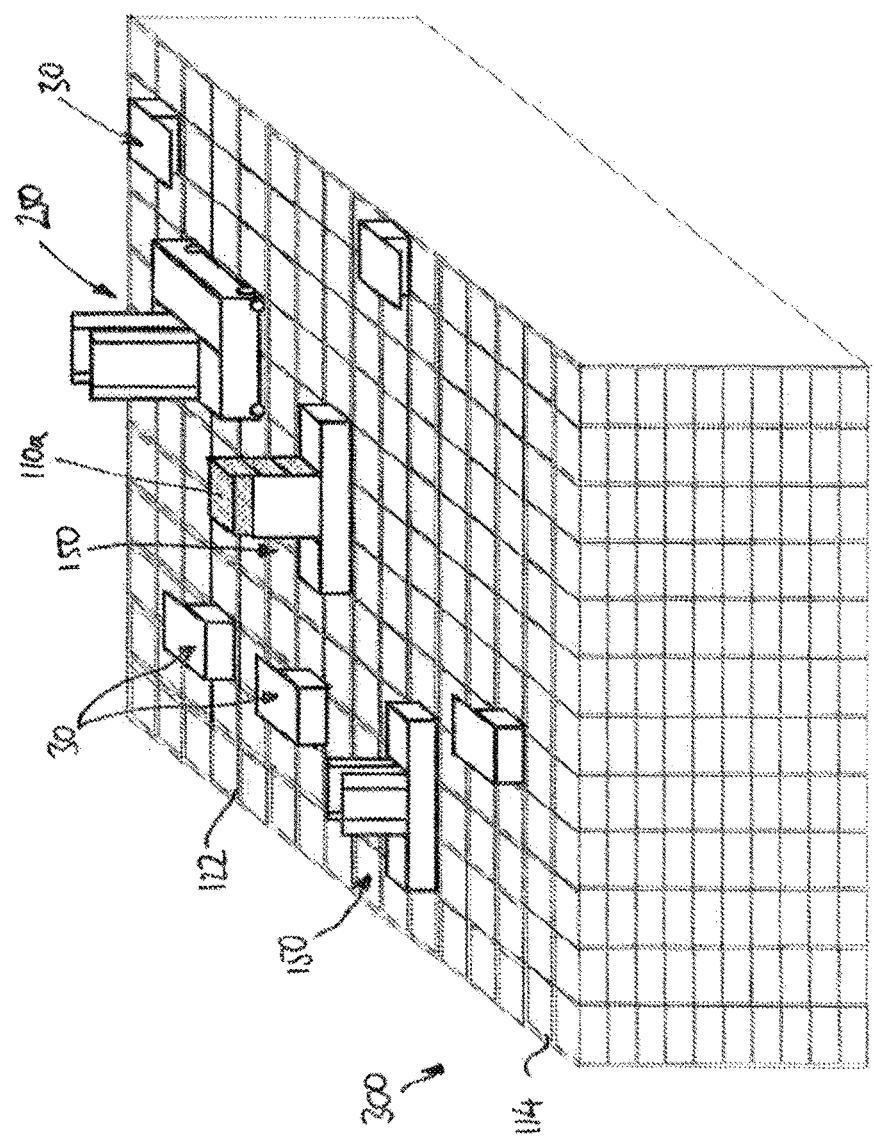
FIG. 11 is a schematic perspective view of a storage system according to another embodiment of the present invention.

In a large storage system, it can be desirable to include more than one type of multi-bin load handling device to provide flexibility of operation. For example, FIG. 11 shows a storage system 300 with a frame structure 114 identical to that described with reference to FIG. 6. In the FIG. 11 embodiment, however, two multi-bin load handling devices 150 of the type shown in FIG. 7, and one multi-bin load handling device 250 of the type shown in FIG. 10 are mounted on the rails 122, in addition to a plurality of single-bin load handling devices 30 of the type shown in FIG. 3. This arrangement offers increased flexibility by allowing sets of multiple bins to be temporarily stored on top of other stacks when required, but minimises the use of the relatively expensive and bulky load handling devices 250 that are able to perform that task, recognising that many of the target bin retrieval operations can be adequately served by retaining the non-target bins 110a in one of the simpler multi-bin load handling devices 150 for a short period of time.

Figure 12:
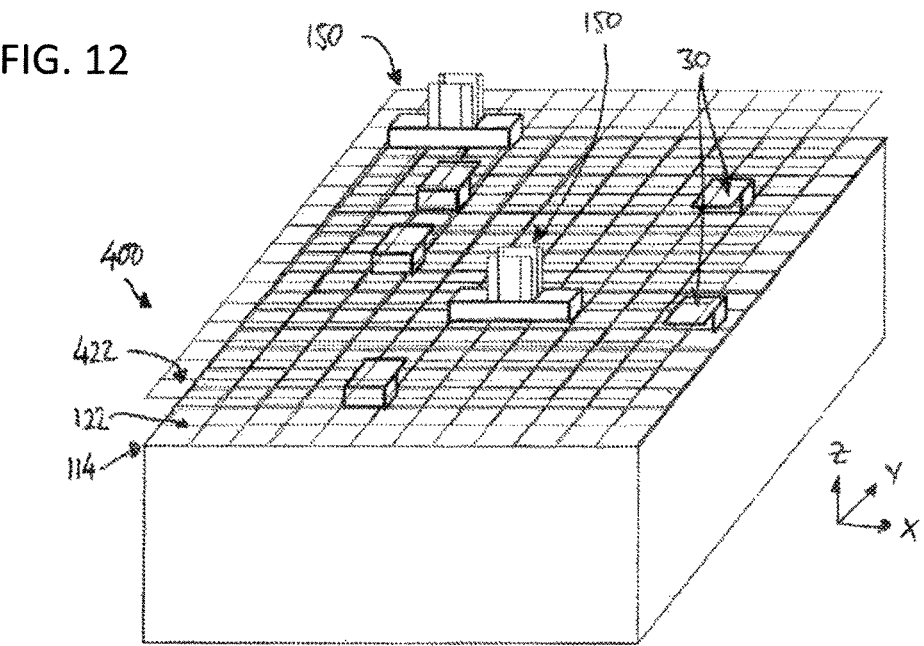
FIG. 12 is a schematic perspective view of a storage system according to a further embodiment of the present invention.
Figure 13:
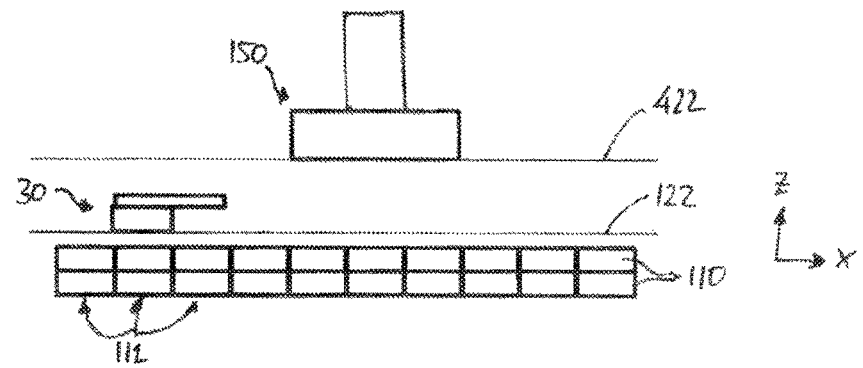
FIG. 13 is a schematic side view of part of the storage system of FIG. 12.

FIGS. 12 and 13 illustrate a storage system 400 according to another embodiment. In this case, the single-bin load handling devices 30 are mounted on rails 122 that form part of the frame structure 114, as already described with reference to previous embodiments of the invention. However, the multi-bin load handling devices 150 are mounted on a separate grid of rails 422, which is spaced from the top of the frame structure 114 in the Z direction. In this example, the multi-bin load handling devices 150 are of the type described with reference to FIG. 7.

In this arrangement, the multi-bin load handling devices 150 are able to lift sets of bins clear of the space in which the single-bin load handling devices 30 operate, generally improving the accessibility of the stacks 112 in the storage system 400.

Furthermore, provided that the spacing of the two grids of rails 122, 422 is sufficient, it is possible to deposit a lifted set of non-target bins 110a (not shown in FIGS. 12 and 13) on top of another stack 112 for temporary storage, by passing the bins 110a back through the aperture 164, thereby freeing up the multi-bin load handling device 150 for other operations. Therefore, by providing a second grid of rails 422, additional functionality can be realised from the relatively inexpensive and compact multi-bin load handling devices 150 of FIG. 7.

Figure 14:
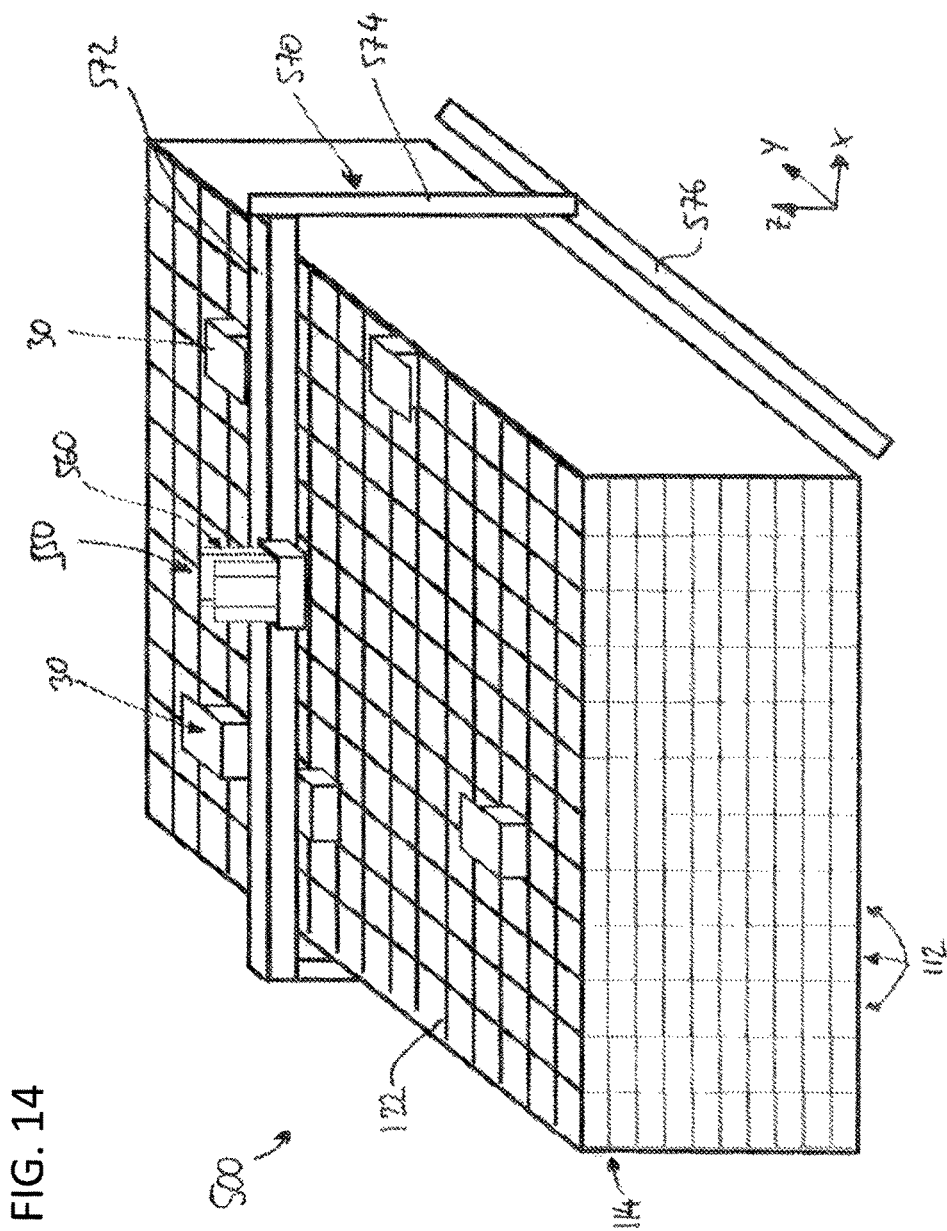
FIG. 14 is a schematic perspective view of a storage system according to another embodiment of the present invention.

FIG. 14 illustrates a storage system 500 according to a further embodiment of the invention. Again, in this embodiment, the single-bin load handling devices 30 are mounted on rails 122 that form part of the frame structure 114, as already described with reference to previous embodiments of the invention. A multi-bin load handling device 550 is mounted on a moveable gantry 570 installed around the frame structure 114.

The gantry 570 comprises a cross member 572 mounted on uprights 574 that are movable along floor-mounted rails 576 arranged parallel to the Y direction. The multi-bin load handling device 550 is moveable in the X direction along the cross member 572, and the cross member 572 is moveable in the Y direction by virtue of the rails 576. In this way, the multi-bin load handling device 550 can be moved to any required position in the X-Y plane.

The multi-bin load handling device 550 is similar to the device 150 described with reference to FIG. 7. However, because the multi-bin load handling device 550 of this embodiment does not run on its own rails, wheels and an associated drive mechanism are not required and therefore the device 550 is more compact.

As in the FIG. 12 embodiment, the multi-bin load handling device 550 in the FIG. 14 embodiment can be configured to deposit sets of bins on top of other stacks 112 for temporary storage whilst the multi-bin load handling device 550 performs other operations. It will be appreciated that more than one multi-bin load handling device 550 could be installed on the gantry 570, and that more than one gantry 570 with one or more further multi-bin load handling devices 550 could be provided.

Figure 15:
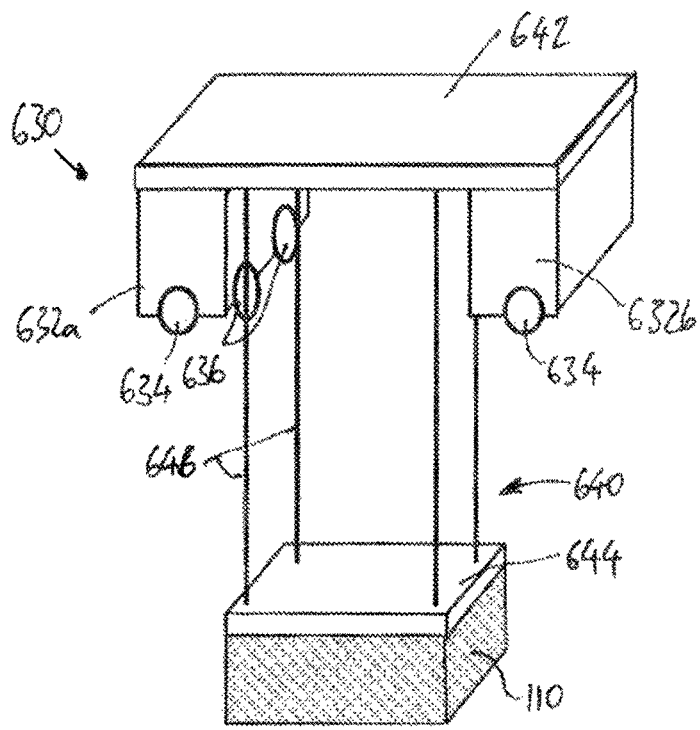
FIG. 15 is a schematic perspective view of another load handling device for use in a storage system according to the invention.

FIG. 15 shows another type of single-bin load handling device 630 that could be used in a storage system according to the present invention. The load handling device 630 is similar to the single-bin load handling device 30 described with reference to FIG. 3. However, in the FIG. 15 variant, a crane device 640 is positioned centrally within the device 630, between two vehicle modules 632a, 632b. The vehicle modules 632a, 632b are linked by a top plate 642, from which a gripper plate 644 is suspended by cables 646.

Each of the vehicle modules 632a, 632b is fitted with a first set of wheels 634, with one wheel 634 of the first set arranged on each of the front and back faces of each module 632a, 632b, and a second set of wheels 636, with wheels 636 of the second set arranged in pairs on the inner side faces of each module 632a, 632b. The load handling device 630 can be used with a frame structure 114 as shown in FIG. 6, in which case the first and second sets of wheels 634, 636 are arranged to engage with the first and second sets of rails 122a, 122b.

The load handling device 630 of FIG. 15 may be used in place of one or more of the cantilever-type single-bin load handling devices 30 in the storage systems previously described. Because the top plate 642 is supported at both ends, the vehicle modules 632a, 632b do not need to counterbalance the weight of the crane device 640, and therefore the load handling device 630 can be significantly lighter than the cantilever-type load handling device 30 illustrated in FIG. 3. This reduces the energy consumption of the device 630, and so the device 630 can carry smaller, cheaper batteries, and the costs of the batteries and the charging times are lower. The lighter weight also helps to reduce wear on components, and can increase the operating speed of the device 630.

Figure 16:
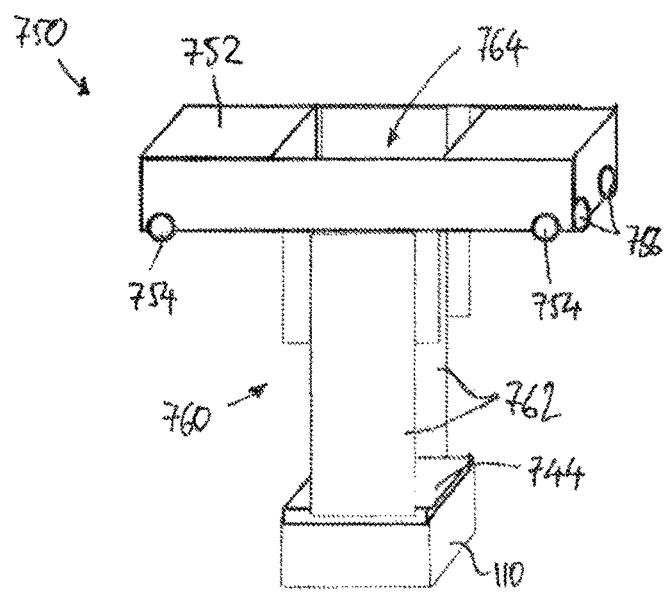
FIG. 16 is a schematic perspective view of a further load handling device for use in a storage system according to the invention.

FIG. 16 shows a further example of a multi-bin load handling device 750 that could be used in a storage system according to the present invention. This load handling device 750 is similar to the multi-bin load handling device 150 described with reference to FIG. 7, and includes a vehicle 752 with first and second sets of wheels 754, 756 for engagement with rails of a frame structure, as previously described. A telescopic lifting device 760 includes two arms 762 mounted either side of a central aperture 764 in the vehicle 752.

A gripper plate 744 is mounted between the ends of the arms 762. The gripper plate 744 is similar to the gripper plate 44 used in the cantilever-type load handling device 30 described with reference to FIG. 3, and is adapted to grip a single bin 110 from above as previously described. In use, the arms 762 can be extended downwards to place the gripper plate 744 on top of a bin 110 to be lifted, and then retracted upwards to lift the bin 110 into the aperture 764.

The load handling device 750 of FIG. 16 can, for example, be used in place of the cantilever-type single-bin load handling device 30 shown in FIG. 3. As for the device 630 of FIG. 15, the device 750 of FIG. 16 can be lighter in weight than the cantilever-type device 30, with the associated advantages.

Another mechanism for lifting bins will now be described with reference to FIGS. 17 and 18.

Figure 1:
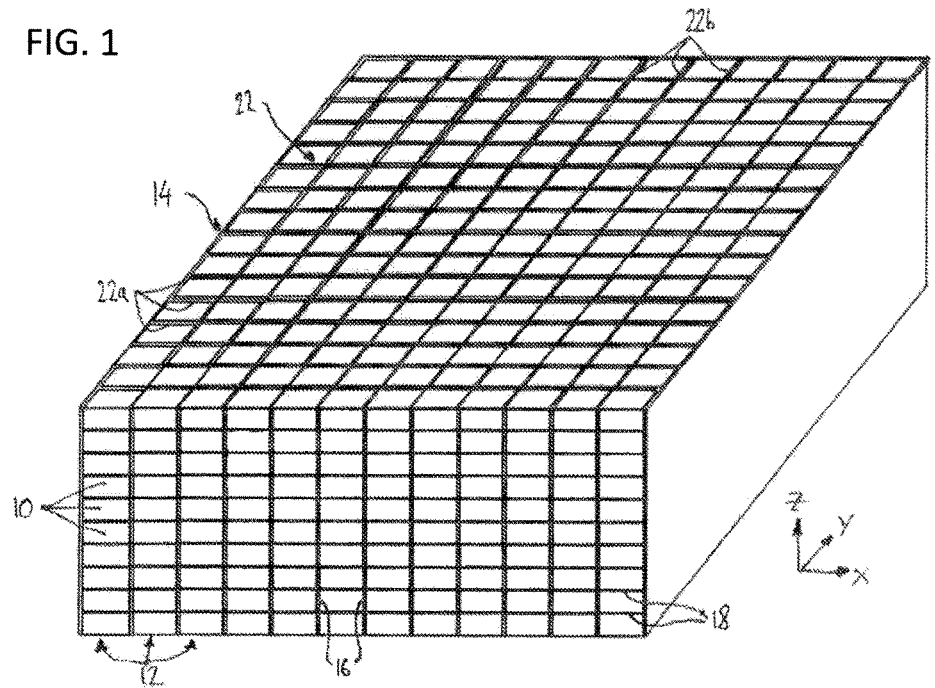
FIG. 1 is a schematic perspective view of a frame structure for housing a plurality of stacks of bins in a known storage system.
Figure 2:
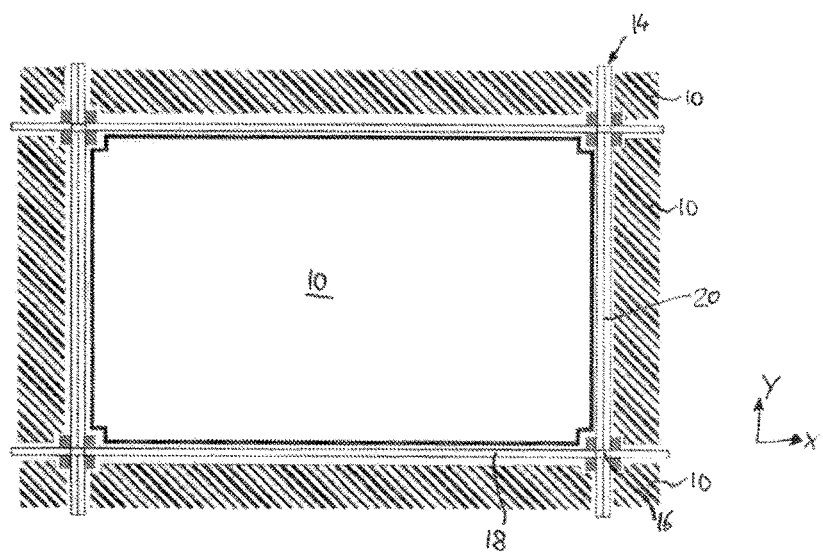
FIG. 2 is a schematic plan view of part of the frame structure of FIG. 1.

FIG. 17 shows a plan view of part of a storage system 800 in which bins 810 are stacked in a frame structure 14 of the type illustrated in FIGS. 1 and 2, in which the horizontal frame members 18 that extend in the X direction are spaced to accommodate the bins 810 therebetween with only small gaps between the bins 810 and the horizontal frame members 18.

Referring additionally to FIG. 18A, each bin 810 is formed with a rim surface 870 around its upper periphery, in which four apertures 872 are formed. The apertures 872 are arranged in two pairs on opposite sides of the bin 810. Each aperture 872 provides an entrance to a cylindrical channel 874 that extends vertically through the side walls of the bin 810.

Referring to FIG. 18B, a load handling device (not shown) having elongate tubular gripping rods 880 is provided to lift the bins 880. In this example, each gripping rod 880 comprises a tube 875 that can be lowered into a channel 874 by way of the respective aperture 872. An anchor mechanism, in the form of laterally-deployable arms 876 operated by a wire 878 disposed within the tube 875, is provided so that, when the end of the rod 880 is in position below the rim of a bin 810 to be lifted, the wire 878 can be pulled to deploy the arms 876 outwardly into the position shown in FIG. 18B. The rod 880 is then drawn upwards, so that the arms 876 engage the undersurface of the rim surface 870 to lift the bin 810. The bin 810 can be released when necessary by retracting the arms 876 of the anchor mechanism. It will be appreciated that other types of anchor mechanism for anchoring the rods to the bins could be used, as will be familiar to those skilled in the art.

A tip part 882 of the tube 875 has a smoothed, pointed shape to aid location of the rod 880 in the aperture 872 and to guide the rod 880 within the channel 874.

In the arrangement of FIGS. 17 and 18, a load handling device may be equipped with four gripping rods 880 arranged to mate with the four apertures 872 in the bin 810. The load handling device may be used to lift one bin 810 at a time. Also, because the channels 874 extend all of the way through the bins 810, a plurality of bins 810 can be lifted simultaneously by feeding the rods 880 down the channels 874 of several bins 810 in a stack, and then deploying the anchor mechanism once the tip 882 of the rod 880 is in position below the rim surface 870 of the lowest bin 810 to be lifted. In this way, the load handling device of this variant can be used to lift a plurality of non-target bins simultaneously during a digging operation. Depending on the design of the load handling device, the gripping rods 880 may be rigid or flexible.

FIGS. 19 to 21 illustrate another storage system 900, which is in many ways similar to that described above with reference to FIGS. 17 and 18. Again, the bins 910 are stacked in a frame structure 14 of the type illustrated in FIGS. 1 and 2.

Each bin 910 includes four apertures 972 arranged in the top rim surface 970 of the bin 910. As shown most clearly in FIGS. 20A and 20B, the apertures 972 provide access to channels 974 that extend vertically through the side walls of the bin 910. In this case, the channels 974 and the apertures 972 are open to the outer sides of the bin 910, by means of vertically extending slots 984.

As in the system 800 described with reference to FIGS. 17 and 18, in the system 900 of FIGS. 19 to 21 a load handling device equipped with four gripping rods 980 is provided. The gripping rods 980, which are shown most clearly in FIG. 20C, function in the same way as described above, and are therefore provided with an anchor mechanism comprising arms 976 that can be deployed outwardly using a wire 978 housed within a tube 975. A smoothed, pointed tip 982 of the tube 975 guides the rod 980 through the aperture 972 and into the channel 974. In this case, the gripping rods 980 are flexible, and can be spooled as will be explained below.

A suitable multi-bin load handling device 950 is shown in FIG. 21. The load handling device 950 includes a vehicle 952 similar to that used in the load handling device 150 shown in FIG. 7. The vehicle 952 has a central aperture 964 through which bins 910 can be lifted, and two sets of wheels 954, 956 for engagement with rails (not shown) on the top of the frame structure 14, as has been described above.

Four spool devices 960 are disposed in opposed pairs on either side of the aperture 964. Each spool device 960 holds a flexible gripping rod 980 of the type described with reference to FIG. 20C. As shown most clearly in FIG. 21A, the gripping rods 980 extend from the respective spool devices 960 and down through the aperture 964.

To lift a plurality of bins 910, the load handling device 950 is moved into position above the target stack. The gripping rods 980 are then fed into the channels 974 of the bins 910, as shown in FIG. 21B, until the ends of the rods 980 are positioned below the rim 970 of the lowest bin 910 in the set of bins 910 to be lifted. The arms 976 of the anchor mechanism are then deployed, and the rods 980 are spooled back on to the spool devices 960, thereby to lift the set of bins 910 through the aperture 964, as shown in FIG. 21C. The flexible rods 980 can be drawn sideways out of the channels 974 through the vertical slots 984 in the sides of the bins 910, allowing the spool devices 960 to be mounted on the vehicle 952 instead of in an elevated position above the vehicle 952 as would be the case if the slots 984 were not provided.

A framework of support members 990 is provided on top of the vehicle 952. The support members 990 are arranged to provide lateral support to the set of stacked bins 910 once they have been lifted through the aperture 964. In this way, the bins 910 remain stable during subsequent movement of the load handling device 950.

It will be appreciated that storage systems can be designed for a particular application using various combinations of the load handling devices and arrangements described above.

In a typical storage system according to the invention, a plurality of single-bin load handling devices and a plurality of multi-bin load handling devices will be employed. The movement and operation of each load handling device is determined by a control program which runs on a computer controller of the system, which is configured to maximise the productivity of the load handling devices. In particular, several methods are possible for performing a 'digging' operation, in which a target bin is retrieved from a stack of bins in which several non-target bins are positioned above the target bin.

In one method of operation, one of the multi-bin load handling devices retrieves all of the non-target bins from the stack. A single-bin load handling device then retrieves the target bin, and the multi-bin load handling device returns the non-target bins to the stack. In this process, the multi-bin load handling device may either lift the non-target bins high enough to allow the single-bin load handling device to operate underneath, or alternatively the multi-bin load handling device may move sufficiently sideways to allow the single-bin load handling device access to the target bin. This method can be used with any of the alternative designs for the multi-bin load handling device described above.

In another method of operation, the multi-bin load handling device lifts all the non-target bins plus the target bin, then moves to a nearby location, releases the target bin and then returns all the non-target bins to the original stack. A single-bin load handling device then moves the single target bin to the destination. This method can be used when the multi-bin load handling devices are arranged on an elevated plane above the single-bin load handling devices, such as in the storage systems illustrated in FIGS. 12 to 14, or when the multi-bin load handling devices are able to release the bins in the same plane, such as is the case for the device illustrated in FIG. 10.

If the number of non-target bins exceeds the load capacity or vertical reach of the multi-bin load handling device, an efficiency benefit can still be realised by removing as many non-target bins as the multi-bin load handling device can handle in one operation. One or more further multi-bin load handling devices, or one or more single-bin load handling devices can then remove the remaining non-target bins, before a single-bin load handling device retrieves the target bin.

If the height of the stacks greatly exceeds the load capacity or vertical reach of the multi-bin load handling devices, it is possible to introduce one or more additional multi-bin load handling devices with a long-reach capability. These long-reach devices would work together with the normal multi-bin load handling devices. In a typical application, only a few long-reach devices would be needed, compared to the number of normal multi-bin load handling devices, which would keep the cost of the overall system down. Alternatively, all of the multi-bin load handling devices could have the long-reach capability.

It will be appreciated that the multi-bin and single-bin load handling devices described above could also be used in storage systems independently of the other aspects of the invention. For example, the lightweight load handling devices described with reference to FIGS. 15 and 16 may be employed in a storage system without additional multi-bin load handling devices. Similarly, the multi-bin load handling devices described in FIGS. 7, 10 and 17 to 21 are capable of lifting a single bin, and therefore could be used without additional single-bin load handling devices.

Many variations and modifications not explicitly described above are also possible without departing from the scope of the invention as defined in the appended claims.

The invention claimed is:

1. A storage system comprising:
   a frame containing a plurality of stacks of containers, wherein a top of the frame includes rails arranged in a grid pattern, the rails having a first set of parallel tracks and a second set of parallel tracks the second set of tracks being substantially perpendicular to the first set of tracks;
   at least one handling device configured for lifting at least one container from a stack in a single operation and moving said container or containers laterally on top of the rails, the handling device including a body mounted on two sets of wheels, a first set of wheels being arranged to engage with at least two tracks of the first set of tracks, a second set of wheels being arranged to engage with at least two tracks of the second set of tracks;

wherein:
the body of the handling device includes a substantially centrally located container receiving space, the container receiving space having container lifting means, the lifting means being adapted so as to releasably engage any container to be lifted, the container receiving space being sized so as to retain at least one container therein, said container remaining engaged with the lifting device therein whilst lateral movement of the handling device occurs.

2. The storage system according to claim 1 in which the storage system comprises:
at least one port from which the at least one container delivered by the handling device is transported away from the storage system.

3. The storage system according to claim 1 in which the storage system comprises:
at least one port at which the at least one container is introduced in to the storage system.

4. The storage system according to claim 1, wherein the load handling device is a robotic load handling device.

5. A robotic load handling device for retrieving at least one target container in a storage system having a frame containing a plurality of stacks of containers, wherein a top of the frame including rails arranged in a grid pattern, and the rails having a first set of parallel tracks and a second set of parallel tracks the second set of tracks being substantially perpendicular to the first set of tracks, the robotic load handling device comprising:
a body and container receiving space located substantially centrally within the body of the load handling device, the container receiving space including lifting means, the lifting means being configured to releasably engage a container to be lifted, the container receiving space being sized so as to retain at least one container therein, said container being configured to remain engaged with the lifting device therein while lateral movement of the load handling device on top of the rails of the storage system occurs.

6. The robotic load handling device according to claim 5, in which the lifting device is configured to lift a plurality of containers said plurality of containers comprising:
a portion of a stack of containers within a storage system.

7. A method of retrieving at least one target container from a storage system, the storage system including a frame containing a plurality of stacks of containers, wherein a top of the frame includes rails arranged in a grid pattern, the rails having a first set of parallel tracks and a second set of parallel tracks the second set of tracks being substantially perpendicular to the first set of tracks; at least one handling device configured for lifting at least one target container from a stack in a single operation and moving said at least container or containers laterally on top of the rails, the handling device including a body mounted on two sets of wheels, a first set of wheels being arranged to engage with at least two tracks of the first set of tracks, and a second set of wheels being arranged to engage with at least two tracks of the second set of tracks; wherein the body of the handling device includes a substantially centrally located container receiving space, the container receiving space having container lifting means, the lifting means being adapted so as to releasably engage any container to be lifted, the container receiving space being sized so as to retain at least one container therein, said container remaining engaged with the lifting device therein whilst lateral movement of the handling device occurs, and wherein the target container is located in a target stack beneath at least one non-target container, the method comprising:
moving a first load handling device to the target stack on top of at least one of the first and second set of tracks;
lifting the at least one non-target container from the target stack in a single lifting operation;
locating the at least one non-target container within a container receiving space of the first load handling device;
transporting the first load handling device with the at least one non-target container located within the container receiving space of the first load handling device in a lateral direction away from the target stack via at least one of the first and second set of tracks;
moving a second load handling device to the target stack, lifting the at least one target container from the target stack; and
locating the at least one target container in a container receiving space of the second load handling device and moving the second load handling device including the target container in a lateral direction on top of at least one of the first and second set of tracks.

8. The storage system according to claim 2 in which the storage system comprises:
at least one port at which the at least one container is introduced into the storage system.

* * * * *